US008878383B2

(12) United States Patent
Kuroishi et al.

(10) Patent No.: US 8,878,383 B2
(45) Date of Patent: Nov. 4, 2014

(54) FAUCET DEVICE

(75) Inventors: Masahiro Kuroishi, Chigasaki (JP); Naoyuki Onodera, Fujisawa (JP); Tomoko Sato, Yamato (JP)

(73) Assignee: Toto Ltd., Fukuoka (JP)

( * ) Notice: Subject to any disclaimer, the term of this patent is extended or adjusted under 35 U.S.C. 154(b) by 28 days.

(21) Appl. No.: 13/821,553

(22) PCT Filed: Jun. 13, 2011

(86) PCT No.: PCT/JP2011/063486
§ 371 (c)(1),
(2), (4) Date: Mar. 7, 2013

(87) PCT Pub. No.: WO2012/032821
PCT Pub. Date: Mar. 15, 2012

(65) Prior Publication Data
US 2013/0167953 A1 Jul. 4, 2013

(30) Foreign Application Priority Data

Sep. 8, 2010 (JP) ................. 2010-200706
Sep. 8, 2010 (JP) ................. 2010-200707

(51) Int. Cl.
F03B 13/00 (2006.01)
F16K 31/04 (2006.01)

(52) U.S. Cl.
CPC ............. *F16K 31/046* (2013.01); *Y02E 10/28* (2013.01)
USPC ............................ 290/54; 290/43

(58) Field of Classification Search
None
See application file for complete search history.

(56) References Cited

U.S. PATENT DOCUMENTS

| 6,509,652 | B2 | 1/2003 | Yumita et al. | |
| 7,919,877 | B2* | 4/2011 | Shimizu et al. | 290/43 |
| 7,956,480 | B2* | 6/2011 | Onodera et al. | 290/54 |
| 8,461,705 | B2* | 6/2013 | Kuroishi et al. | 290/43 |
| 8,698,333 | B2* | 4/2014 | Glasser et al. | 290/43 |
| 2002/0047374 | A1 | 4/2002 | Yumita | |
| 2004/0187934 | A1 | 9/2004 | Hwang | |
| 2009/0026768 | A1 | 1/2009 | Shimizu et al. | |
| 2009/0094740 | A1* | 4/2009 | Ji | 4/623 |
| 2009/0188995 | A1 | 7/2009 | Onodera et al. | |
| 2014/0116553 | A1* | 5/2014 | Schoolcraft et al. | 137/801 |

FOREIGN PATENT DOCUMENTS

| CN | 201186249 Y | 1/2009 |
| JP | 2001-081821 A | 3/2001 |
| JP | 2001-081822 A | 3/2001 |
| JP | 2002081363 A | 3/2002 |
| JP | 2008248474 A | 10/2008 |
| JP | 2009-047162 A | 3/2009 |

OTHER PUBLICATIONS

International Search Report; PCT/JP2011/063486; Jul. 12, 2011.
Written Opinion of the International Searching Authority; PCT/JP2011/063486; Jul. 12, 2011.
The first Office Action issued by the State Intellectual Property Office of the People's Republic of China on Nov. 15, 2013, which corresponds to Chinese Patent Application No. 201180042630.X and is related to U.S. Appl. No. 13/821,553.

* cited by examiner

*Primary Examiner* — Michael Zarroli
(74) *Attorney, Agent, or Firm* — Studebaker & Brackett PC

(57) ABSTRACT

The faucet device (1) of the present invention includes a device body (2); a solenoid valve (12); a spout port forming portion (44); a generator (14) for generating electrical power by rotating an impeller; a solenoid valve-side water-passage forming member (52) for guiding water to the generator; a spout port-side water-passage forming member (42) for guiding water to a spout port; a first elastic member (52*a*) for sealing between the solenoid valve-side water-passage forming member and the generator and allowing relative displacement therebetween; a second elastic member (42*b*) for sealing between the spout port-side water-passage forming member and the generator and allowing relative displacement therebetween; a third elastic member (60) for coupling the solenoid valve-side water-passage forming member and the device body and allowing relative displacement therebetween; and a fourth elastic member (58) for coupling the spout port-side water-passage forming member and the device body and allowing relative displacement therebetween.

13 Claims, 17 Drawing Sheets

(a)

(b)

(a)

(b)

(c)

(a)

(b)

(a)

(b)

FAUCET DEVICE

TECHNICAL FIELD

The present invention relates to a faucet device, and in particular to a faucet device configured to drive a solenoid valve by electrical power from a built-in generator to switch between water stopping and water spouting.

BACKGROUND ART

JP2008-248474A (Patent Document 1) describes an automatic faucet. This automatic faucet comprises a built-in generator in a device body, and is adapted to generate electrical power by the flow of water to be spouted from the faucet device. The electrical power generated by the generator is used for driving a solenoid valve adapted to switch between water stopping and water spouting of the faucet device.

When it becomes possible in this way to have a built-in generator and to open and close the solenoid valve by electrical power of the generator, it becomes possible to install an automatic faucet configured to sense a user's finger with a sensor and, based on which, to open and close the solenoid valve to switch between water stopping and water spouting, without using an external power source. The automatic faucet which does not require any external power source provides significant advantage that it can be installed without choosing power source environment for the installation location because it operates by simply substituting for an existing faucet device that is installed in a washroom etc.

LIST OF PRIOR ART DOCUMENTS

Patent Documents

Patent Document 1: JP2008-248474A

SUMMARY OF THE INVENTION

Problem to be Solved by the Invention

In the case of having a built-in generator in a device body, it is important to downsize the generator particularly for improvement of design and space factor of the faucet device. In order to downsize the generator, it is necessary to downsize a power generating magnet and a power generating coil which are built in the generator. In order to generate sufficient electrical power to operate a solenoid valve, a sensor, etc. by the downsized power generating magnet and power generating coil, it is necessary to increase the magnetic flux density of the power generating magnet or to increase the number of turns of the power generating coil.

However, the magnetic flux density of the power generating magnet or the like is increased, the electromagnetic force acting within the generator becomes greater, which becomes a source of generation of vibration. Specifically, by attaching the power generating magnet to an impeller and disposing the power generating coil adjacent to the power generating magnet rotating with the impeller, induced current would flow in the power generating coil to generate electrical power. In doing so, increasing the magnetic flux density of the power generating magnet enhances the electromagnetic force acting between the power generating magnet and the power generating coil (or a pole piece for inducing magnetism). Since this electromagnetic force varies in magnitude in association with a rotation angle of the impeller, the varying electromagnetic force creates vibration in the generator. In particular, the downsized generator results in a downsized and light-weighted built-in impeller, and thus the impeller becomes more likely to be vibrated.

The automatic faucet described in JP2008-248474A has a problem that the built-in generator is directly fixed to the main body by screws (numerals 22 and 42 in FIG. 1(b) of JP2008-248474A), so the vibration of the generator is propagated to the main body, which in turn causes an installation wall of the automatic faucet to is vibrated and is likely to generate abnormal noise. In particular, in the case of downsized generator, there is a problem that large abnormal noise is likely to be generated because larger excitation force is generated from the generator.

Accordingly, the present invention is directed towards providing a faucet device which has a built-in downsized generator and is capable of suppressing abnormal noise that is generated.

Means for Solving the Problem

In order to solve the foregoing problem, the present invention provides a faucet device configured to drive a solenoid valve by electrical power from a built-in generator to switch between water stopping and water spouting, comprising: a device body; a solenoid valve disposed within the device body, and adapted to switch between water stopping and water spouting; a spout port forming portion formed with a spout port, and adapted to cause water that passes through the solenoid valve to be spouted; an impeller-driven generator equipped with an impeller, a power generating magnet and a power generating coil, and adapted to rotate the impeller by flow of water that passes through the solenoid valve to generate electrical power for driving the solenoid valve; a solenoid valve-side water-passage forming member for guiding water that passes through the solenoid valve to the generator; a spout port-side water-passage forming member for guiding water that passes through the generator toward the spout port; a first elastic member for ensuring water-tightness between the solenoid valve-side water-passage forming member and the generator and allowing relative displacement between the solenoid valve-side water-passage forming member and the generator; a second elastic member for ensuring water-tightness between the spout port-side water-passage forming member and the generator and allowing relative displacement between the spout port-side water-passage forming member and the generator; a third elastic member for coupling the solenoid valve-side water-passage forming member to the device body and allowing relative displacement between the solenoid valve-side water-passage forming member and the device body; and a fourth elastic member for coupling the spout port-side water-passage forming member to the device body and allowing relative displacement between the spout port-side water-passage forming member and the device body.

In the invention configured in this manner, the water that has passed through the solenoid valve passes through the solenoid valve-side water-passage forming member and flows into the generator. The generator rotates the impeller by the flow of water that has passed through the solenoid valve to generate electrical power for driving the solenoid valve. The water that has flowed out from the generator is guided by the spout port-side water-passage forming member to the spout port, from which it is spouted. The solenoid valve side of the generator is connected to the solenoid valve-side water-passage forming member via the first elastic member, and the solenoid valve-side water-passage forming member is coupled to the device body via the third elastic member. On the other hand, the spout port side of the generator is connected to the spout port-side water-passage forming member via the second elastic member, and the spout port-side water-passage forming member is coupled to the device body via the fourth elastic member.

According to the invention configured in this manner, the solenoid valve side of the generator is coupled to the device body via the first elastic member and the third elastic member while the spout port side of the generator is coupled to the device body via the second elastic member and the fourth elastic member, and thus the vibration propagated to the device body can be sufficiently suppressed to suppress abnormal noise that is generated. Although the invention disclosed in JP2008-248474A also includes a seal material such as an O-ring disposed between the generator and a line coupled thereto, this seal material cannot ensure a sufficient vibration stroke of the generator, so that the vibration that is propagated cannot be suppressed sufficiently. Further, when it is sought to ensure a large vibration stroke with the seal material between the generator and the line, there is a problem that the vibration of the generator would develop a seal defect which results in water leak and decreased durability of the seal material. According to the faucet device of the present invention, the propagation of the vibration is suppressed in two stages: one by the first and second elastic members disposed between the generator and the member connected thereto, and one by the third and fourth elastic members disposed between the connected member and the device body. This allows the first and second elastic members for ensuring water-tightness to be utilized for suppression of vibration, while sufficiently suppressing the propagation of vibration. Further, ensuring of the vibration stroke is performed in two stages, so that decrease in water-tightness and degradation of stability of the elastic members can be avoided.

In the present invention, preferably the third elastic member and the fourth elastic member are configured to excite vibration having vertical components by a horizontal excitation force.

According to the invention configured in this manner, the third and fourth elastic members excite vibration having vertical components by a horizontal excitation force, and thus the vibration of the generator would be larger in a vertical direction and smaller in a horizontal vibration. For this reason, even if the stream of water spouted from the faucet device is vibrated due to the vibration of the generator, the vibration is mainly of the same vertical direction as the direction in which the spouted water flows, and is less recognizable by a user relative to the case in which it is vibrated in a horizontal direction. This makes it possible to sufficiently suppress the propagation of vibration of the generator, while reducing disturbance in the stream of water which is recognizable by the user to allow the faucet device to have an improved quality level.

In the present invention, preferably an impeller rotary shaft of the impeller is disposed in a substantially horizontal direction, and the third elastic member and the fourth elastic member are disposed such that a straight line connecting the third elastic member and the fourth elastic member is oriented toward a substantially horizontal direction.

According to the invention configured in this manner, the straight line connecting the third elastic member and the fourth elastic member is oriented toward a substantially horizontal direction, and thus vertical vibrational components of the generator can be further increased and disturbance in the stream of water which is recognizable by the user can be reduced more.

In the present invention, preferably the first elastic member, the second elastic member, the third elastic member and the fourth elastic member support the generator such that the vibration of the generator on the side closer to the solenoid valve is larger than the vibration of the generator on the side closer to the spout port.

According to the invention configured in this manner, the vibration of the generator becomes larger in a direction from the side closer to the spout port toward the side closer to the solenoid valve, and thus disturbance in the streams of spouted water can be reduced. Further, vibration of the device body can be better suppressed because vibration is reduced on the spout port side which is closer to a distal end of the device body and is difficult to ensure the rigidity.

In the present invention, preferably the impeller is disposed between the third elastic member and the fourth elastic member at a position closer to the third elastic member.

According to the invention configured in this manner, the impeller is disposed at a position closer to the third elastic member, and thus the impeller, which would be a source of vibration due to the action of electromagnetic force at the time of electrical power generation, does not strongly excite the distal end of the device body, so that vibration of the device body can be better suppressed.

In the present invention, preferably the impeller, the power generating magnet and the power generating coil are arranged along the impeller rotary shaft of the impeller.

According to the invention configured in this manner, the moment of inertia of the rotating portion of the generator can be decreased as compared, for example, to the conventional generators in which a power generating magnet is disposed on the radially outer side of a blade of the impeller. This makes it possible to improve the power generation efficiency of the generator, decrease the magnetic flux density of the power generating magnet which is necessary to achieve power requirements, and suppress the generation of vibration.

In the present invention, preferably the impeller, the power generating coil, the power generating magnet and the impeller are disposed in this order from the side closer to the spout port.

According to the invention configured in this manner, the impeller which would be a source of vibration is disposed at a position distant from the spout port, and thus it does not strongly excite the distal end of the device body, so that vibration of the device body can be better suppressed.

In the present invention, preferably the generator further comprises a pole piece for guiding magnetism of the power generating magnet to the power generating coil, the pole piece extending from the power generating coil to the periphery of the power generating magnet.

According to the invention configured in this manner, magnetism of the power generating magnet is guided by the pole piece to the power generating coil, and thus the degree of freedom in placement of the power generating magnet and the power generating coil can be increased, which enables a source of vibration to be provided at a position further distant from the spout port.

In the present invention, preferably the device body is made from metal and comprises a base portion, a horizontal portion, and a cover portion, and wherein the base portion is fixed to an installation wall, the horizontal portion is integrally formed with the base portion and extending in a substantially horizontal direction from the base portion, the horizontal portion has an opening on the upper side thereof, and the cover portion detachably attached to the horizontal portion in a manner to cover the opening of the horizontal portion, and wherein the generator, the solenoid valve-side water-passage forming member and the spout port-side water-passage forming member are disposed within the horizontal portion, the third elastic member detachably couples the solenoid valve-side water-passage forming member to the horizontal portion through the opening of the horizontal portion, and the fourth elastic member detachably couples the spout port-side water-passage forming member to the horizontal portion through the opening of the horizontal portion.

In the invention configured in this manner, the device body comprises a base portion fixed to an installation wall, and a horizontal portion extending in a substantially horizontal direction from the base portion, wherein the device body is made from metal and is integrally formed. The horizontal portion is formed with an opening on the upper side thereof, which is covered by a detachably attached cover portion. The third elastic member and the fourth elastic member are detachably coupled to the horizontal portion through the opening.

According to the invention configured in this manner, the base portion and the horizontal portion of the device body are made from metal and are integrally formed, and thus they are highly rigid and less likely to be vibrated by the vibration of the generator, so that the generation of abnormal noise can be suppressed. Further, the horizontal portion is formed with an opening on the upper side thereof, through which a unitization of assembled generator, spout port-side water-passage forming member, solenoid valve-side water-passage forming member, and first to fourth elastic members can be inserted and mounted, enabling an easy assembly. Such a structure of the device body satisfies both of suppression of abnormal noise and improvement in assembly.

In the present invention, preferably the first elastic member, the second elastic member, the third elastic member and the fourth elastic member support the generator such that the vibration of the generator on the side closer to the solenoid valve is larger than the vibration of the generator on the side closer to the spout port.

According to the invention configured in this manner, the vibration of the generator becomes larger in a direction from the side closer to the spout port toward the side closer to the solenoid valve, and thus disturbance in the streams of spouted water can be reduced. Further, vibration of the device body can be better suppressed because vibration is reduced on the spout port side which is closer to a distal end of the device body and is difficult to ensure the rigidity.

In the present invention, preferably the impeller is disposed between the third elastic member and the fourth elastic member at a position closer to the third elastic member.

According to the invention configured in this manner, the impeller is disposed at a position closer to the third elastic member, and thus the impeller, which would be a source of vibration due to the action of electromagnetic force at the time of electrical power generation, does not strongly excite the distal end of the device body, so that vibration of the device body can be better suppressed.

In the present invention, preferably the faucet device further comprises a topside elastic mount member which is disposed between the installation wall and the base portion, and wherein the topside elastic mount member is adapted to suppress vibration propagated from the device body to the installation wall.

According to the invention configured in this manner, the topside elastic mount member is disposed between the installation wall and the base portion, and thus the vibration that is propagated from the generator to the device body can be prevented from being propagated to the installation wall, thereby the abnormal noise that is generated from the installation wall can be suppressed.

In the present invention, preferably the faucet device further comprises a fastener member and a backside elastic mount member, and wherein the fastener member is disposed on the reverse side of the installation wall, and is adapted to fix the device body to the installation wall by sandwiching the installation wall between the fastener member and the base portion, and wherein the backside elastic mount member is disposed between the fastener member and the reverse side of the installation wall, and is adapted to suppress vibration propagated to the installation wall.

According to the invention configured in this manner, the backside elastic mount member is disposed between the fastener member and the reverse side of the installation wall, and thus the vibration propagated from the device body to the installation wall via the fastener member can be suppressed, thereby the abnormal noise that is generated from the installation wall can be further suppressed.

Effect of the Invention

According to the faucet device of the present invention, a downsized built-in generator can be included, while abnormal noise that is generated can be suppressed.

DESCRIPTION OF EMBODIMENTS

A preferred embodiment of the present invention will now be described with reference to the accompanying drawings.

Figure 1:
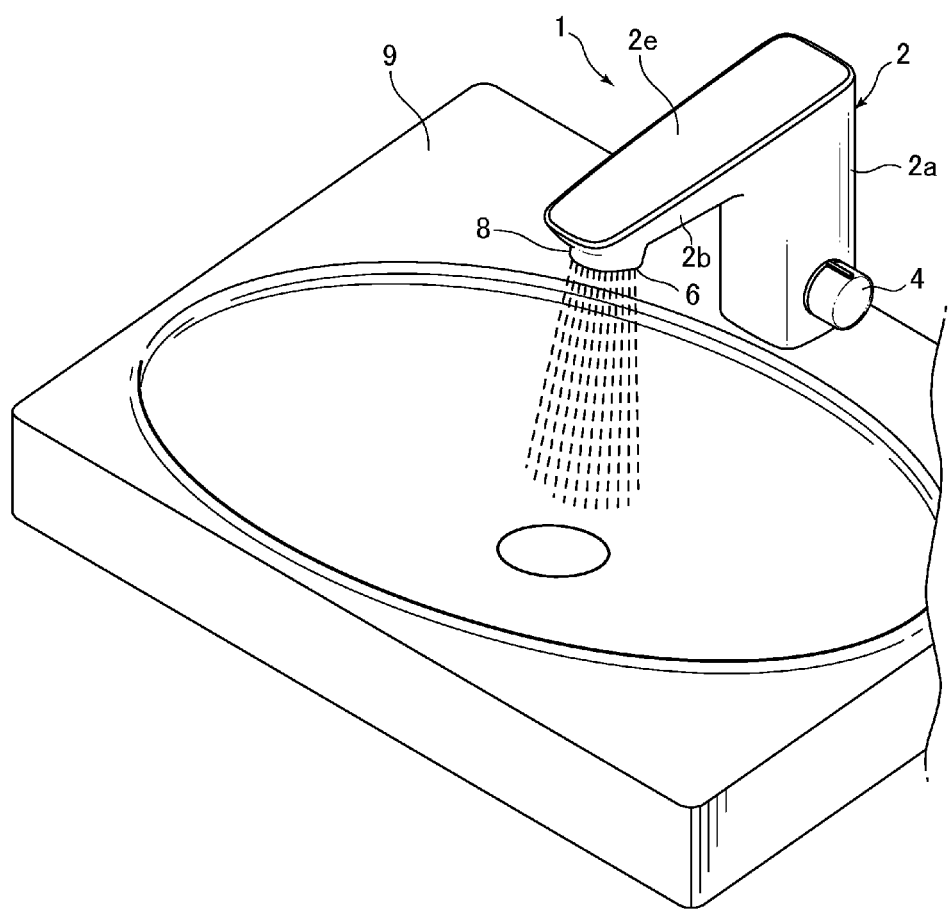
FIG. 1 is a perspective view illustrating an entire faucet device in accordance with an embodiment of the present invention.

FIG. 1 is a perspective view illustrating an entire faucet device in accordance with an embodiment of the present invention.

As illustrated in FIG. 1, a faucet device 1 of this embodiment comprises a device body 2, a temperature adjusting knob 4 provided on a base portion 2a of the device body 2, a spout port 6 provided on a distal end of a horizontal portion 2b of the device body 2, and a presence sensor 8 provided on an edge side of the distal end of the horizontal portion 2b.

The faucet device 1 of this embodiment has the base portion 2a fixed to an installation wall 9 such as an upper end face of a wash stand, and is configured such that when a user places his/her finger under the spout port 6, the presence sensor 8 detects it and a built-in solenoid valve is automatically opened to spout water from the spout port 6. When the presence sensor 8 does not detect the finger any more, the solenoid valve is automatically closed to be in a water stopping state. Further, the faucet device 1 is configured such that temperature of the spouted hot and cold water can be adjustable by adjusting the temperature adjusting knob 4.

A structure of the faucet device 1 according to the embodiment will now be described with reference to FIGS. 1 to 16.

Figure 2:
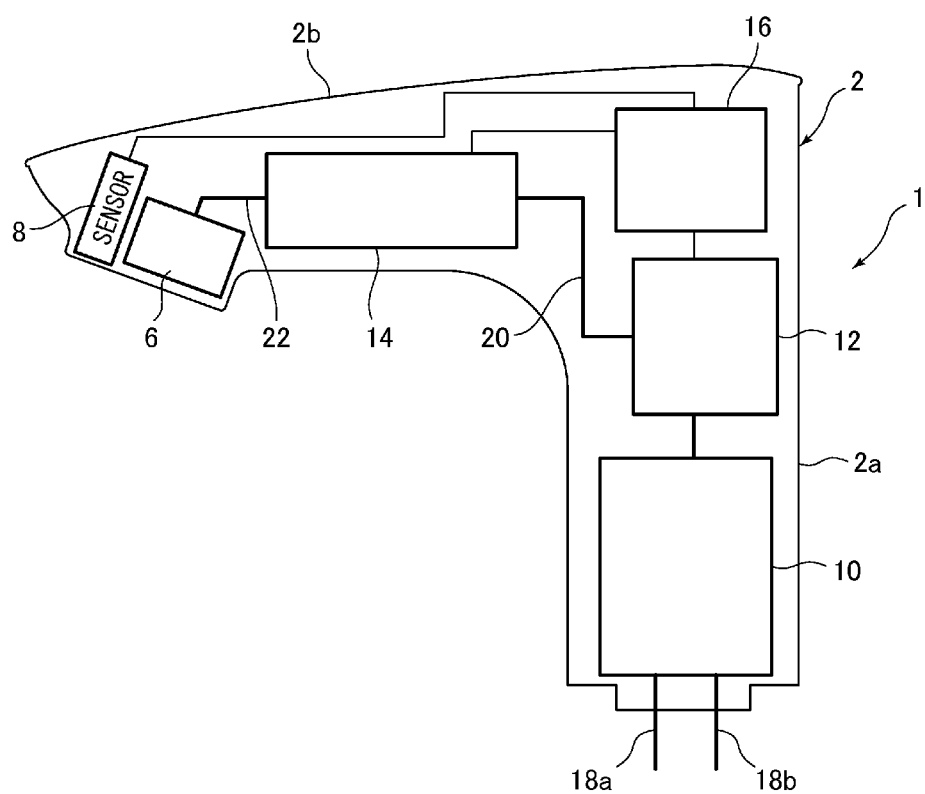
FIG. 2 is a block diagram schematically illustrating an internal structure of the faucet device in accordance with the embodiment.
Figure 3:
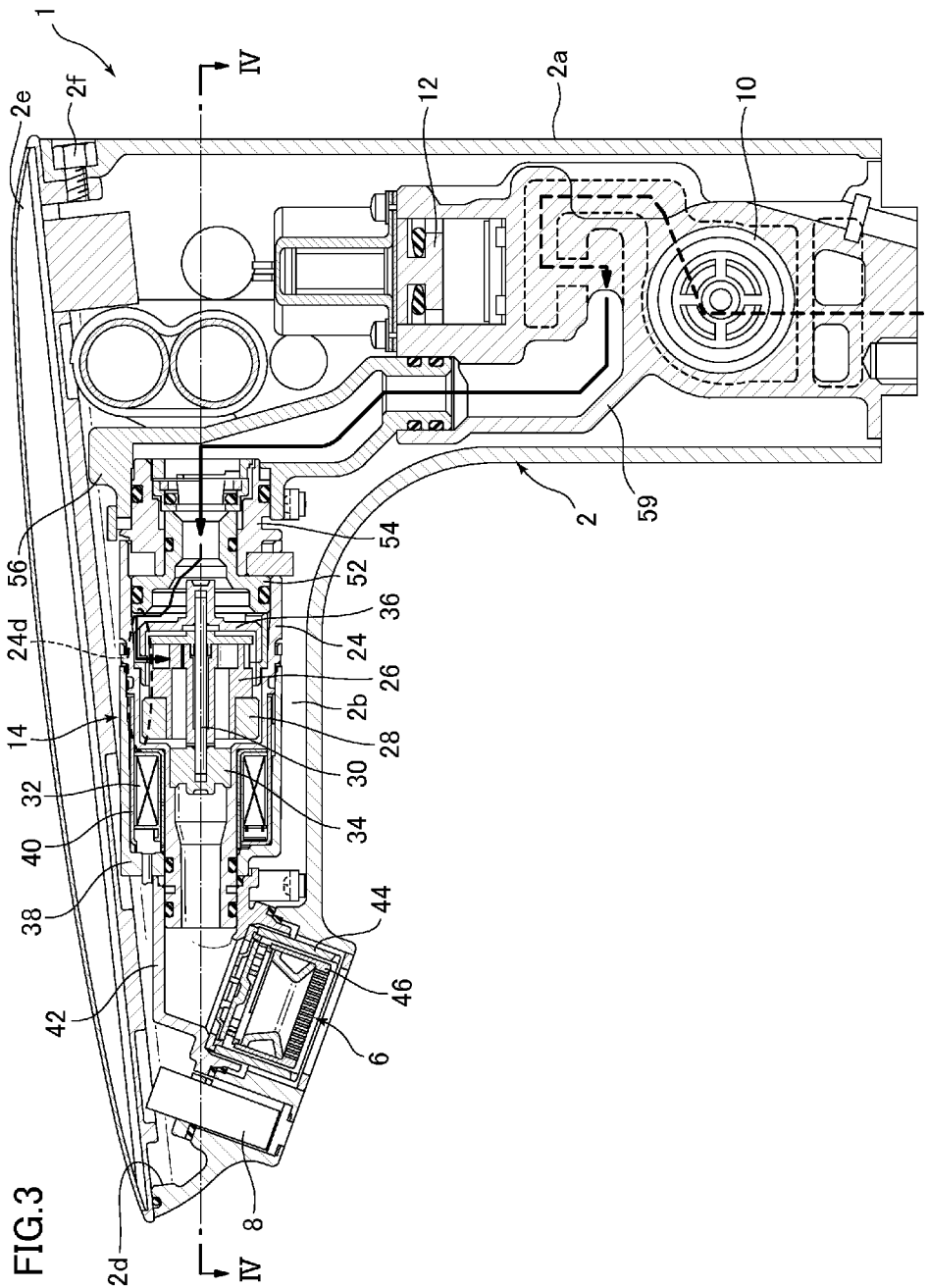
FIG. 3 is a cross-sectional side view of the faucet device in accordance with the embodiment.
Figure 4:
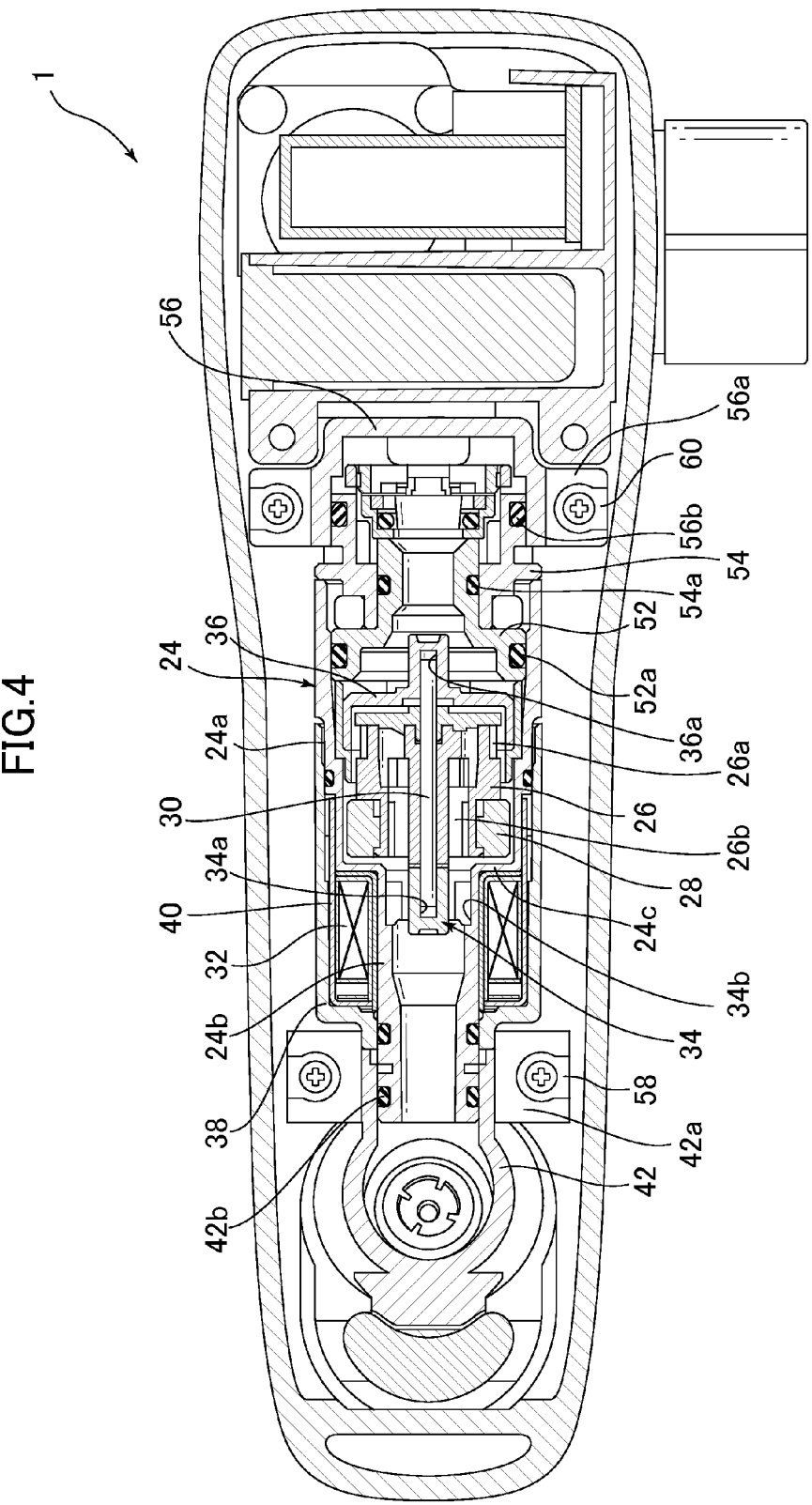
FIG. 4 is a cross-sectional plane view taken along the line IV-IV of FIG. 3.
Figure 5:
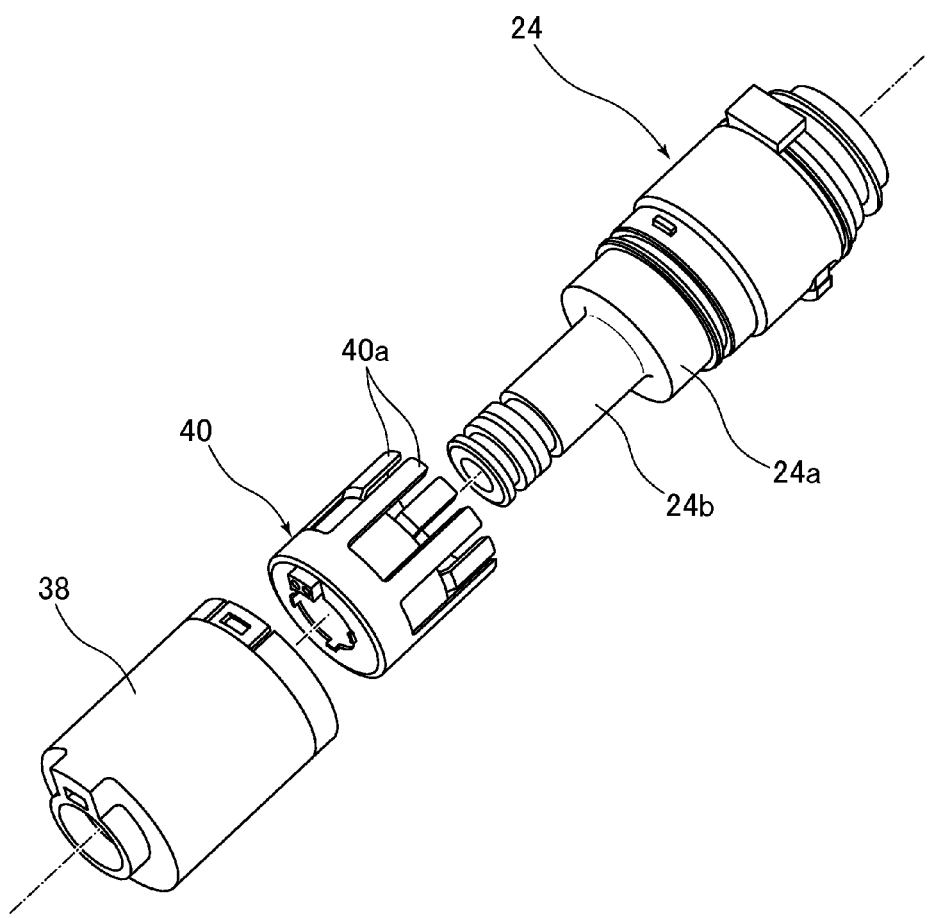
FIG. 5 is an exploded perspective view of a built-in generator in the faucet device in accordance with the embodiment.
Figure 6:
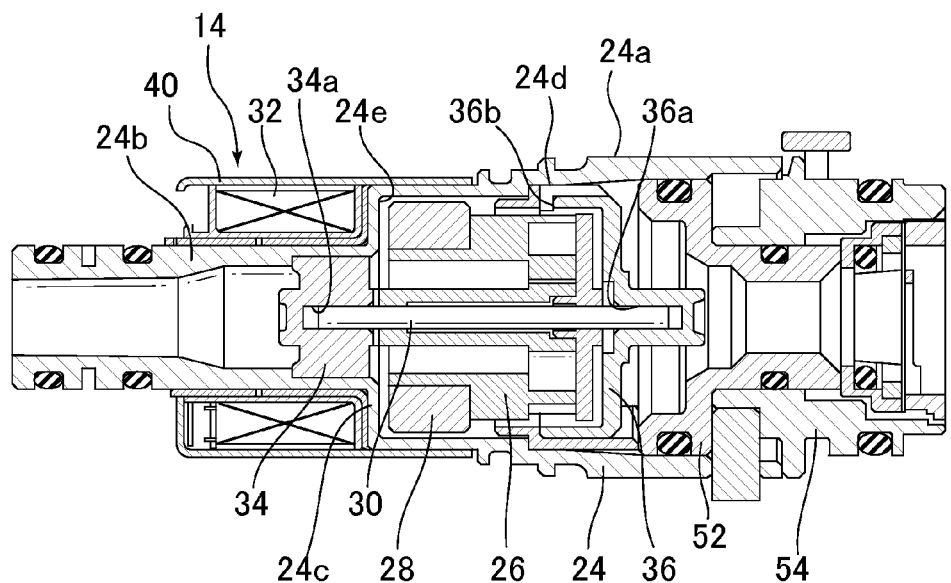
FIG. 6 is a cross-sectional, enlarged view of the built-in generator in the faucet device in accordance with the embodiment.
Figure 7:
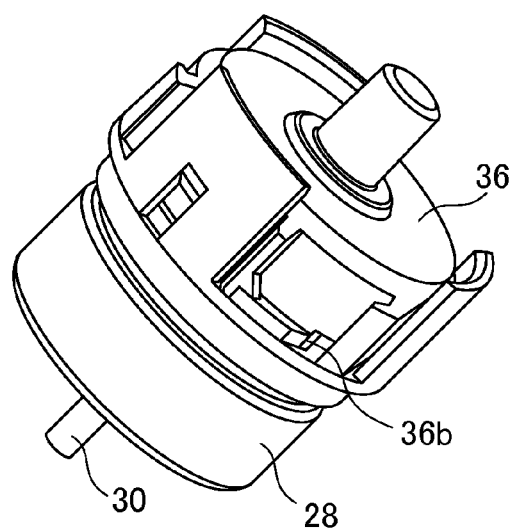
FIG. 7 is a perspective view illustrating a built-in impeller and the associated components in the built-in generator in the faucet device in accordance with the embodiment.
Figure 8:
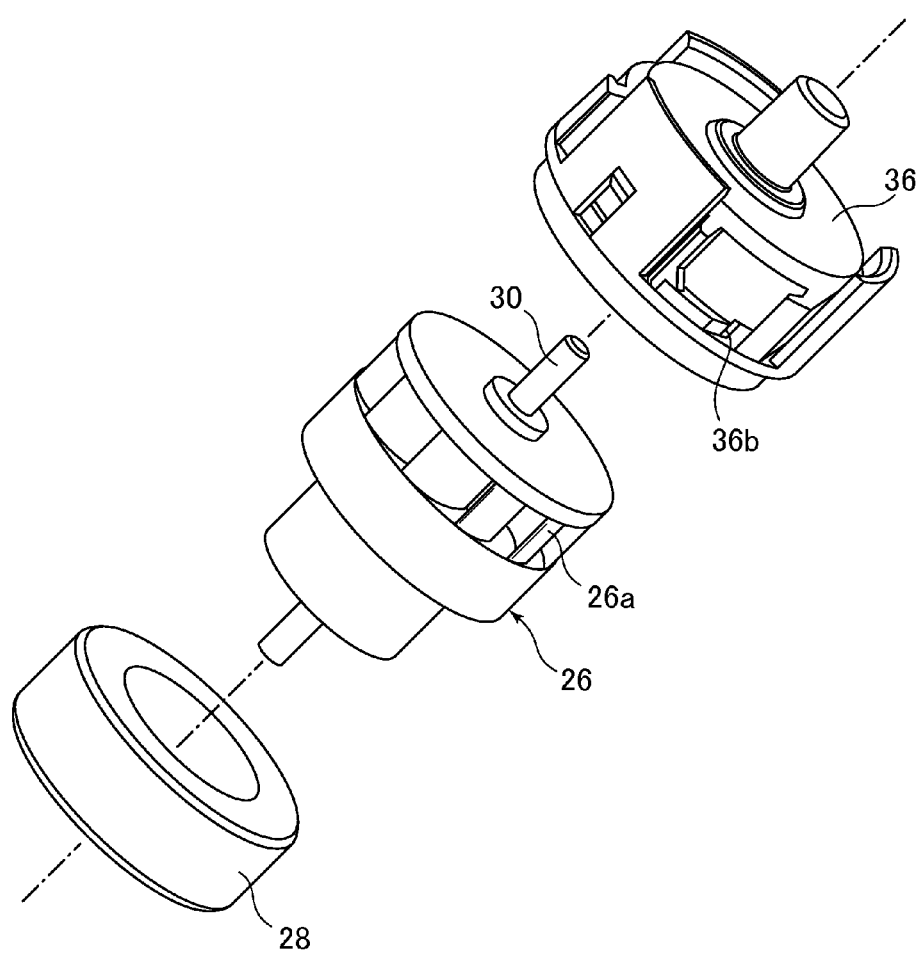
FIG. 8 is an exploded perspective view illustrating the built-in impeller and the associated components in the built-in generator in the faucet device in accordance with the embodiment.
Figure 9:
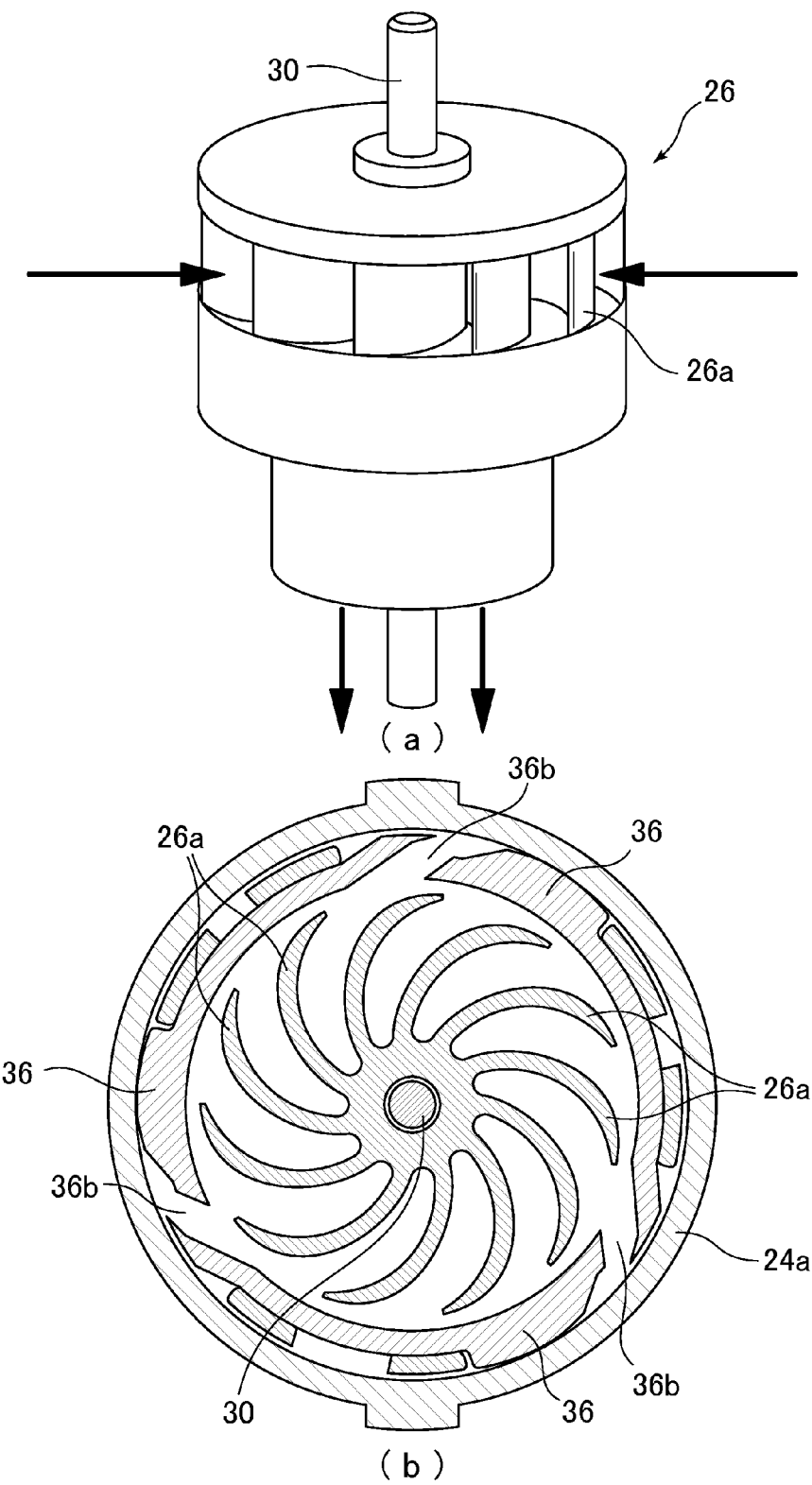
FIG. 9 illustrates (a) a perspective view and (b) a cross-sectional view of the built-in impeller in the built-in generator in the faucet device in accordance with the embodiment.
Figure 10:
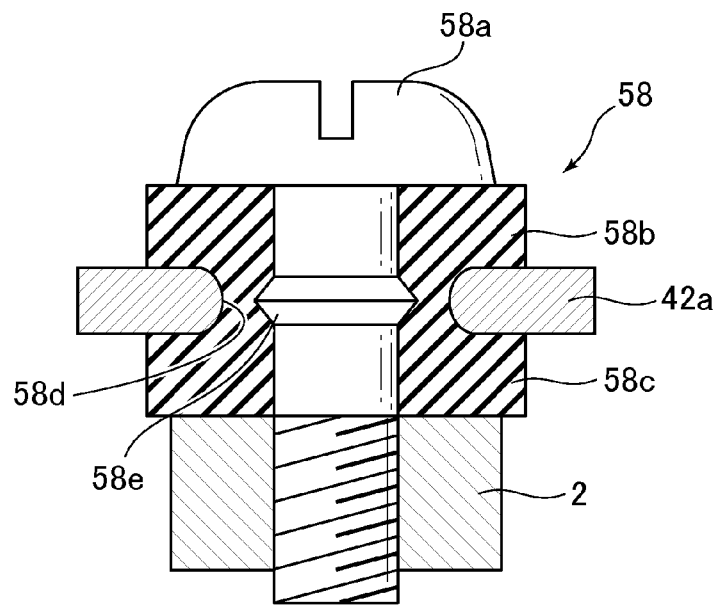
FIG. 10 is a cross-sectional view of a rubber bush for supporting the built-in generator in the faucet device to a device body in accordance with the embodiment.
Figure 10:
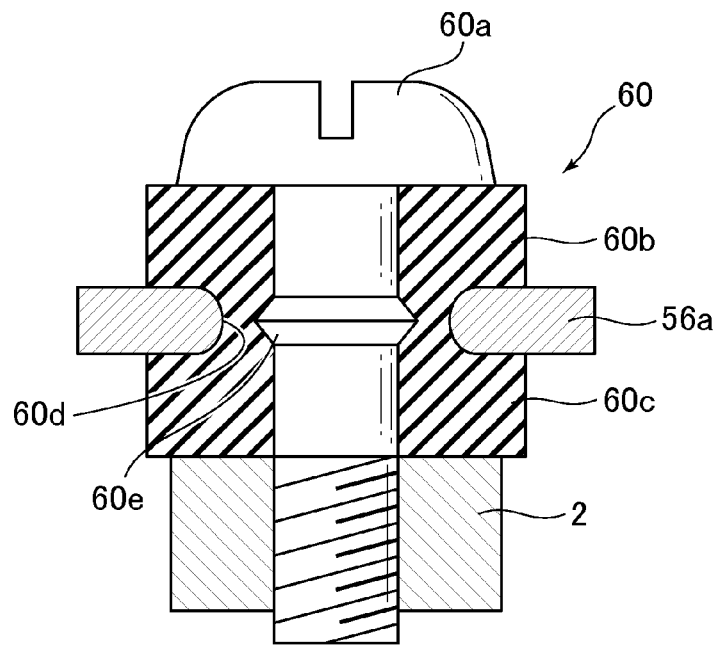
Figure 11:
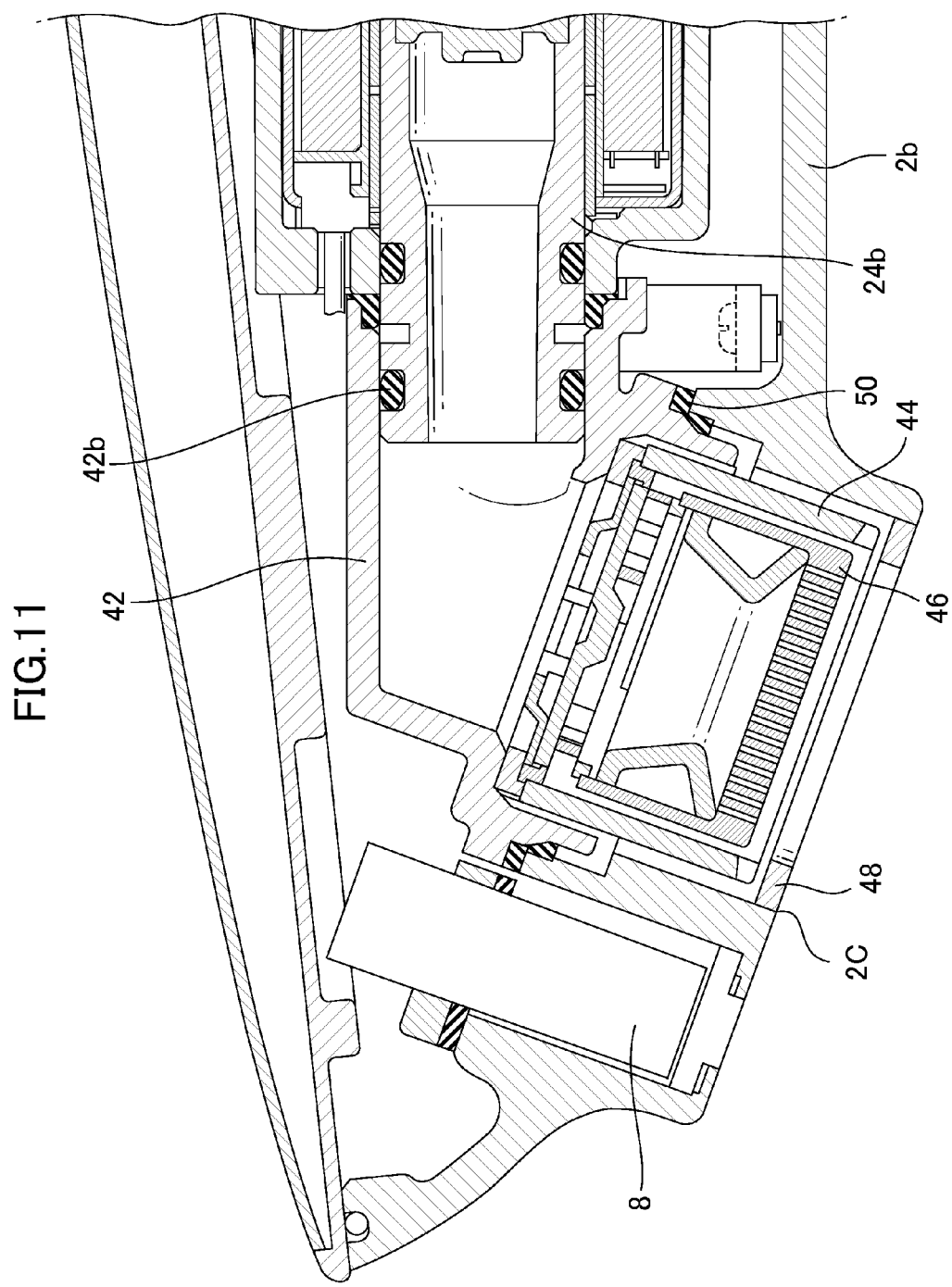
FIG. 11 is a cross-sectional, enlarged view of an area near the spout port of the faucet device in accordance with the embodiment.

FIG. 2 is a block diagram schematically illustrating an internal structure of the faucet device 1 of this embodiment. FIG. 3 is a cross-sectional side view of the faucet device 1. FIG. 4 is a cross-sectional plane view taken along the line IV-IV of FIG. 3. FIG. 5 is an exploded perspective view of a built-in generator in the faucet device 1. FIG. 6 is a cross-sectional, enlarged view of the built-in generator. FIG. 7 is a perspective view illustrating a built-in impeller and the associated components in the generator, and FIG. 8 is an exploded perspective view thereof. FIG. 9 illustrates (a) a perspective view and (b) a cross-sectional view of the built-in impeller in the generator. FIG. 10 is a cross-sectional view of a rubber bush for supporting the generator to a device body. FIG. 11 is a cross-sectional, enlarged view of an area near the spout port of the faucet device 1.

As illustrated in FIG. 1, the device body 2 is made from metal, and has a base portion 2a fixed to an installation wall 9, and a horizontal portion 2b which is integrally formed with the base portion 2a and extends in a substantially horizontal direction from the upper end of the base portion 2a. The base portion 2a is a box type in shape having an approximately square cross-section, and is fixed to the installation wall 9 in a manner to extend in a substantially vertical direction therefrom. The horizontal portion 2b is a box type in shape having an opened upper side, extends in a substantially horizontal direction from the upper end of the base portion 2a, and includes a spout port 6 provided on its distal end. Further, the horizontal portion 2b has a cover portion 2e that is detachably attached thereto and covers an opening 2d (FIG. 12) on the upper side of the horizontal portion 2b.

As illustrated in FIG. 2, the device body 2 has a temperature adjusting valve 10, a solenoid valve 12, an impeller-driven generator 14, and a controller 16 built in. A filter (not shown) may be provided on the upstream side of the temperature adjusting valve 10. Further, a constant flow valve (not shown) may be provided between the solenoid valve 12 and the generator 14.

The temperature adjusting valve 10 is built in the base portion 2a of the device body 2, to which a hot water supply pipe 18a and a cold water supply pipe 18b are connected. The temperature adjusting valve 10 is configured to mix hot water and cold water which are supplied from each supply pipe respectively, based on the setting of the temperature adjusting knob 4, and adjust them to hot and cold water at suitable temperature to be flowed out. The temperature adjusting valve 10 is of a commonly-used type so that description of detailed structure thereof is omitted.

The solenoid valve 12 is built in the base portion 2a of the device body 2, and is connected to the downstream side of the temperature adjusting valve 10 such that the hot and cold water mixed by the temperature adjusting valve 10 flows therein. The solenoid valve 12 is configured to open and close based on a control signal sent from the controller 16. The solenoid valve 12 is of a commonly-used type so that description of detailed structure thereof is omitted.

The generator 14 is disposed in the base portion 2a of the device body 2 with being oriented in an approximately horizontal direction. The generator 14 is connected such that the hot and cold water that has passed through the solenoid valve 12 flows therein through a solenoid valve-side line 20, and the hot and cold water that has passed through the generator 14 is spouted from the spout port 6 through a spout port-side line 22. The electrical power generated by the generator 14 is used to operate the solenoid valve 12, the controller 16, the presence sensor 8, and the like. The internal structure of the generator 14 will be described below.

The controller 16 is configured to generate a control signal for opening and closing the solenoid valve 12 based on a detection signal that is input from the presence sensor 8. Specifically, the controller 16 is made up of a microprocessor, a memory, and programs for operating the microprocessor and the memory, etc. (not shown).

As illustrated in FIGS. 3 to 9, the generator 14 has a generator water-passage forming member 24, an impeller 26 disposed within the generator water-passage forming member 24, a power generating magnet 28 attached to the impeller 26, an impeller rotary shaft 30 for rotatably supporting the impeller 26, and a power generating coil 32 disposed on the outside of the generator water-passage forming member 24. Further, as illustrated in FIGS. 3 and 4, the power generating coil 32, the power generating magnet 28 and a blade 26a of the impeller 26 are disposed in side-by-side relation to each other in this order from the side closer to the spout port 6 along the impeller rotary shaft 30.

As illustrated in FIG. 6, the generator water-passage forming member 24 has a large diameter portion 24a which is an expanded-diameter portion in which an approximately cylindrical water passage is formed, a small diameter portion 24b in which an approximately cylindrical water passage that is narrower than the large diameter portion 24a is formed, and a stepped portion 24c which is a deformation permissive portion by which the large diameter portion 24a is connect to the small diameter portion 24b. The large diameter portion 24a and the small diameter portion 24b constitute a generator water passage therein. Further, a corner portion 24e at which the large diameter portion 24a and the stepped portion 24c are joined together is applied with an R, i.e., formed to have an arc-shaped cross-section such that the large diameter portion 24a and the stepped portion 24c are smoothly joined. Due to the smoothly joined large diameter portion 24a and the stepped portion 24c at a downstream edge of the large diameter portion 24a, air bubbles that have been pooled in the large diameter portion 24a are smoothly evacuated therefrom to the downstream small diameter portion 24b. In this embodiment, the corner portion 24e serves as evacuant means for facilitating the evacuation of air bubbles.

The impeller 26 is rotatably disposed within the large diameter portion 24a. The impeller 26 is disposed such that its impeller rotary shaft 30 is in alignment with a central axis of the large diameter portion 24a, and is configured to rotate about the impeller rotary shaft 30 when the hot and cold water flows through the generator water passage. In addition, as illustrated in FIGS. 3 and 4, the generator water-passage forming member 24 is disposed such that its central axis is oriented to an approximately horizontal direction. For this reason, in the event that outside air enters from the spout port 6 at the time of water stopping of the faucet device 1, the entered air gathers in an air pooling chamber 24d at the inner upper side of the large diameter portion 24a. Specifically, the air pooling chamber 24d is a space located on the uppermost side in the water passage in the device body 2, so that the entered air is floated within the water passage and gathered in the air pooling chamber 24d.

The small diameter portion 24b is a pipe having a smaller diameter than the large diameter portion 24a, and is formed to have a central axis in alignment with the central axis of the large diameter portion 24a. In addition, on the upstream edge of the small diameter portion 24b, a bearing portion 34 is disposed for supporting the downstream edge side of the impeller rotary shaft 30. Specifically, the bearing portion 34 is disposed adjacent to the stepped portion 24c.

The stepped portion 24c is formed to connect the large diameter portion 24a to the small diameter portion 24b by a wall surface extending in a direction orthogonal to the central axis. In this embodiment, the stepped portion 24c is formed to have a thin wall thickness, and is configured to be mainly deformed when a force acts on the generator water-passage forming member 24.

The bearing portion 34 is an approximately cylindrical member which is fitted inside of the small diameter portion 24b, and has a bearing hole 34a provided on a central axis thereof for receiving the impeller rotary shaft 30 and a plurality of through-holes 34b provided on its periphery for allowing passage of the hot and cold water. As stated above, the bearing portion 34 is disposed adjacent to the stepped portion 24c, thereby to act to limit the amount of deformation of the stepped portion 24c.

On the other hand, as illustrated in FIGS. 6 to 9, the upstream edge side of the impeller rotary shaft 30 is rotatably supported by a bearing hole 36a provided in the middle of a nozzle casing 36. The nozzle casing 36 is a circular shallow cup-like shaped plate and has the bearing hole 36a provided at the center thereof. The nozzle casing 36 is an approximately cup-like shaped member disposed within the large diameter portion 24a in a manner to obstruct the central region of the water passage. The hot and cold water that has flowed from the upstream side into the large diameter portion 24a is guided by the nozzle casing 36 to the periphery of the large diameter portion 24a, and flows through a gap between an outer periphery of the nozzle casing 36 and an inner wall surface of the large diameter portion 24a to the downstream side. Then, the hot and cold water flows from an injection port 36b provided on the lateral side of the nozzle casing 36 toward the center of the large diameter portion 24a to rotate the impeller 26. Specifically, the injection port 36b injects the water from the periphery of the large diameter portion 24a toward the impeller 26.

Further, the metallic impeller rotary shaft 30 extends from the nozzle casing 36 to the bearing hole 34a through the impeller 26 in a manner to go across the stepped portion 24c. For this reason, the amount of deformation of the stepped portion 24c is limited by the impeller rotary shaft 30.

As illustrated in FIGS. 6 to 8, the impeller 26 is an approximately cylindrical member, to which the impeller rotary shaft 30 is attached along the central axis of the impeller 26. The blade 26a is provided on the upstream edge side of the impeller 26, so that the impeller 26 is rotated by the flow of hot and cold water from the peripheral edge to the center of the nozzle casing 36. In addition, an axially penetrating impeller water-passage 26b is provided within the impeller water-passage 26b, so that the hot and cold water gathered from the peripheral edge to the center passes through the impeller water-passage 26b and flows into the small diameter portion 24b.

Further, the outer periphery of the impeller 26 has a reduced diameter on the downstream side thereof, and the annular power generating magnet 28 is attached to the reduced diameter portion. Therefore, when the power generating magnet 28 is projected to the direction of the impeller rotary shaft 30, the projection overlaps with a part of the blade 26a of the impeller 26. Specifically, the power generating magnet 28 and the blade 26a of the impeller 26 partially overlap with each other in the projection to the direction of the impeller rotary shaft 30.

As illustrated in FIG. 9, three injection ports 36b are provided equiangularly on the lateral side of the nozzle casing 36. Specifically, each injection port 36b is formed at regular intervals in a circumferential direction of a circle centered on the impeller rotary shaft 30. The hot and cold water is injected from the injection port 36b to a substantially tangential direction of the outer circumference of the impeller 26, and hits against the blade 26a of the impeller 26 in a direction orthogonal to the impeller rotary shaft 30 to rotate the impeller 26. The hot and cold water that has hit against the blade 26a flows toward the center of the impeller 26 before flowing into the impeller water-passage 26b at the center of the impeller 26, and flows through the impeller water-passage 26b in a horizontal direction.

The power generating magnet 28 is constructed in an approximately annular shape, and has an N-pole and an S-pole alternately formed along the circumference thereof.

The power generating coil 32 is constructed in an annular shape, and is disposed to surround the small diameter portion 24b of the generator water-passage forming member 24. Further, the upstream edge of the power generating coil 32 abuts the stepped portion 24c of the generator water-passage forming member 24. The abutment of the power generating coil 32 against the stepped portion 24c limits the amount of deformation of the stepped portion 24c (deformation permissive portion) in the event of vibration of the generator 14. The power generating coil 32 and the power generating magnet 28 are disposed in side-by-side relation to each other in an axial direction of the generator water-passage forming member 24, where the rotation of the power generating magnet 28 along with the impeller 26 develops electromotive force in the power generating coil 32. Thus, the impeller 26, the power generating magnet 28 and the power generating coil 32 are disposed in this order from the upstream side in the generator 14.

Further, as illustrated in FIG. 5, the generator 14 has a waterproof cover 38 and a pole piece 40.

The waterproof cover 38 is an approximately cylindrical member which is attached to cover a part of the generator water-passage forming member 24. The waterproof cover 38 extends from an area on the upstream side of the small diameter portion 24b to an area on the downstream side of the large diameter portion 24a and disposed to cover a part thereof. In addition, the power generating coil 32 and the pole piece 40 are contained in a space between an external surface of the generator water-passage forming member 24 and an internal surface of the waterproof cover 38 to prevent the position gap of the pole piece 40 in the event of vibration of the generator 14. Further, the waterproof cover 38 is dimensioned such that the power generating coil 32 is sandwiched and fixed between the waterproof cover 38 and the stepped portion 24c of the generator water-passage forming member 24. An O-ring is disposed between the waterproof cover 38 and the large diameter portion 24a, as well as between the waterproof cover 38 and the small diameter portion 24b respectively, and is adapted to prevent the hot and cold water from entering into the waterproof cover 38. Further, the waterproof cover 38 is disposed over an area from the small diameter portion 24b to the large diameter portion 24a in a manner to go across the stepped portion 24c, so that the amount of deformation of the stepped portion 24c in the event of vibration of the generator 14 is limited.

The pole piece 40 is constructed from a thin plate of a magnetic material, and is formed to surround the inner and outer periphery sides of the power generating coil 32. Further, the pole piece 40 has a plurality of pawls 40a which extend to surround an area from the power generating coil 32 to the large diameter portion 24a. Each pawl 40a extends in an axial direction of the large diameter portion 24a in a manner to contact with the outer periphery of the large diameter portion 24a. Since the large diameter portion 24a contains the power generating magnet 28 inside, the pawls 40a would extend from the power generating coil 32 to the periphery of the power generating magnet 28, so that the magnetism of the power generating magnet 28 is induced to the power generating coil 32 via the pawls 40a of the pole piece 40. Specifically, the pole piece 40 and the power generating magnet 28 are disposed to be opposed to each other in a radial direction of a circle centered on the impeller rotary shaft 30, and transmit the magnetism to a radial direction of this circle. Further, each pawl 40a of the pole piece 40 extends to surround the large diameter portion 24a, and thus the amount of deformation of the stepped portion 24c is limited by the pole piece 40.

A fixation structure of the generator 14 will now be described with reference to FIGS. 3, 4, 10 and 11.

As illustrated in FIG. 4, a spout port-side water-passage forming member 42 is connected to a distal end of the small diameter portion 24b of the generator water-passage forming member 24. The spout port-side water-passage forming member 42 serves as a spout port-side line 22 (FIG. 2). In addition, a spout port-side support bracket 42a is formed on both sides of the spout port-side water-passage forming member 42. Further, a packing (gasket) 42b is disposed between the spout port-side water-passage forming member 42 and the small diameter portion 24b to ensure water-tightness between the small diameter portion 24b and the spout port-side water-passage forming member 42. The packing (gasket) 42b allows slight relative displacement between the small diameter portion 24b of the generator 14 and the spout port-side water-passage forming member 42. The packing (gasket) 42b serves as a second elastic member.

Further, as illustrated in FIG. 11, a spout port forming ring 44 as a spout port forming portion and a flow rectifying member 46 are attached to a distal end of the spout port-side water-passage forming member 42. The spout port forming ring 44 is a cylindrical member, and the hot and cold water that has passed through the spout port-side water-passage forming member 42 is spouted through inside of the spout port forming ring 44. The spout port forming ring 44 is disposed on the inner side of a spout port disposing aperture 2c that is provided on the distal end of the device body 2. A gap is provided between the spout port disposing aperture 2c and the spout port forming ring 44, and the spout port forming ring 44 is fixed to be out of contact with the device body 2. In addition, the lower end of the spout port forming ring 44 is positioned with being retracted more to the inner side than the spout port disposing aperture 2c. Further, the gap between the outer periphery of the spout port forming ring 44 and the spout port disposing aperture 2c is covered with a gap cover 48. Furthermore, the spout port-side water-passage forming member 42 is in contact with the device body 2 via a support packing (gasket) 50 as a supporting point forming member. In this way, the spout port-side water-passage forming member 42 is elastically supported by the support packing (gasket) 50.

On the other hand, as illustrated in FIG. 4, a stepped cylindrical first solenoid valve-side water-passage forming member 52 and a second solenoid valve-side water-passage forming member 54 are inserted into the large diameter portion 24a of the generator water-passage forming member 24, and a third solenoid valve-side water-passage forming member 56 is connected to the second solenoid valve-side water-passage forming member 54. The first, second and third solenoid valve-side water-passage forming members 52, 54 and 56 serve as a solenoid valve-side line 20. It is noted that, as illustrated in FIG. 3, the upstream edge of the third solenoid valve-side water-passage forming member 56 contains the temperature adjusting valve 10 and the solenoid valve 12, and is connected to a base member 59 disposed within the base portion 2a.

In addition, a solenoid valve-side support bracket 56a is provided on the third solenoid valve-side water-passage forming member 56. A packing (gasket) 52a is disposed between the large diameter portion 24a and the first solenoid valve-side water-passage forming member 52, a packing (gasket) 54a is disposed between the first solenoid valve-side water-passage forming member 52 and the second solenoid valve-side water-passage forming member 54, and a packing (gasket) 56b is disposed between the second solenoid valve-side water-passage forming member 54 and the third solenoid valve-side water-passage forming member 56, to ensure water-tightness between these members.

The packing (gasket) 52a allows slight relative displacement between the large diameter portion 24a of the generator 14 and the first solenoid valve-side water-passage forming member 52, and ensures water-tightness therebetween. The packing (gasket) 54a allows slight relative displacement between the first solenoid valve-side water-passage forming member 52 and the second solenoid valve-side water-passage forming member 54, and ensures water-tightness therebetween. The packing (gasket) 56b allows slight relative displacement between the second solenoid valve-side water-passage forming member 54 and the third solenoid valve-side water-passage forming member 56, and ensures water-tightness therebetween. The packings (gaskets) 52a, 54a and 56b serve as a first elastic member.

Thus, the spout port-side line 22 includes a packing (gasket) 42b disposed between the spout port-side water-passage forming member 42 and the small diameter portion 24b, while the solenoid valve-side line 20 includes packings (gaskets) 52a, 54a and 56b disposed between each solenoid valve-side water-passage forming member. For this reason, the solenoid valve-side line 20 has larger room for deformation by the packings (gaskets) than the spout port-side line 22, and the solenoid valve-side line 20 is configured to be more easily deformable than the spout port-side line 22. In addition, the connection between the small diameter portion 24b of the generator water-passage forming member 24 and the spout port-side water-passage forming member 42 via the packing (gasket) 42b serves as a flection allowing portion for allowing flection between the spout port-side line 22 and the generator 14.

A mounting structure of the generator 14 with respective to the device body 2 will now be described with reference to FIGS. 3, 4 and 10. FIG. 10(a) is a cross-sectional view illustrating a supporting structure of the spout port-side support bracket 42a of the spout port-side water-passage forming member 42, and FIG. 10(b) is a cross-sectional view illustrating a supporting structure of the solenoid valve-side support bracket 56a of the third solenoid valve-side water-passage forming member 56.

As illustrated in FIGS. 3 and 4, the generator 14 is mounted in the device body 2 via the spout port-side support bracket 42a of the spout port-side water-passage forming member 42 and the solenoid valve-side support bracket 56a of the third solenoid valve-side water-passage forming member 56 which are separate members from the generator 14. Further, between the mounted generator 14 and an inner wall surface of the device body 2, namely between the generator 14 and an inner wall surface of the horizontal portion 2b as well as between the generator 14 and a back surface of the cover portion 2e, space is formed all over the periphery of the generator 14. This allows vibration of the generator 14 and prevents generation of abnormal noise caused by the vibrating generator 14 directly hitting against the device body 2.

As illustrated in FIG. 10(a), the spout port-side support bracket 42a is attached to the device body 2 by a screw 58a via a spout port-side rubber bush as a fourth elastic member. Also, as illustrated in FIG. 10(b), the solenoid valve-side support bracket 56a is attached to the device body 2 by a screw 60a via a solenoid valve-side rubber bush 60 as a third elastic member. Further, as illustrated in FIG. 3, the spout port-side rubber bush 58 and the solenoid valve-side rubber bush 60 are disposed on substantially the same level. Specifically, a straight line connecting the spout port-side rubber bush 58 and the solenoid valve-side rubber bush 60 is oriented in a substantially horizontal direction.

The spout port-side rubber bush 58 and the solenoid valve-side rubber bush 60 constitute vibration excitation means. Specifically, the generator 14 is supported in a condition which is very likely to be vibrated by the spout port-side rubber bush 58 and the solenoid valve-side rubber bush 60. Meanwhile, in the generator 14, the power generating magnet 28 is rotated along with the impeller 26, which produces a relative rotation to the fixed power generating coil 32. This develops electromotive force in the power generating coil 32, and electromagnetic force in a direction orthogonal to the impeller rotary shaft 30 between the power generating magnet 28 and the power generating coil 32. Since this electromagnetic force varies depending on a relative rotational position between the power generating magnet 28 and the power generating coil 32, the electromagnetic force vibrationally varies with the rotation of the power generating magnet 28. Due to a synergistic effect of this vibrational force and the support by the vibration excitation means of the generator 14, vibration in a direction orthogonal to the impeller rotary shaft 30 is excited in the generator 14. In particular, in this embodiment, variation in the developed electromagnetic force is made to be large by employing a single-layer coil as the power generating coil 32, thereby the vibration of the generator 14 can be effectively excited.

As illustrated in FIG. 10(a), the spout port-side rubber bush 58 is formed of an upper surface portion 58b which is located on an upper surface of the spout port-side support bracket 42a as a support bracket, a lower surface portion 58c which is located on a lower surface of the spout port-side support bracket 42a, and a peripheral portion 58d which is located around the screw 58a. Specifically, the upper surface portion 58b is a portion which is wedged between the upper surface of the spout port-side support bracket 42a and a head of the screw 58a, and the lower surface portion 58c is a portion which is wedged between the lower surface of the spout port-side support bracket 42a and the horizontal portion 2b of the device body 2. Also, the peripheral portion 58d is a portion which is wedged between a shaft portion of the screw 58a and an inner wall surface of a hole of the spout port-side support bracket 42a.

Accordingly, when the generator 14 and the spout port-side water-passage forming member 42 are displaced in a vertical direction, the upper surface portion 58b and the lower surface portion 58c of the spout port-side rubber bush 58 are mainly subjected to elastic deformation. On the other hand, when the generator 14 and the spout port-side water-passage forming member 42 are displaced in a horizontal direction, the peripheral portion 58d of the spout port-side rubber bush 58 is mainly subjected to elastic deformation. Further, thickness of the upper surface portion 58b and the lower surface portion 58c of the spout port-side rubber bush 58 is greater than thickness of the peripheral portion 58d, and thus the spout port-side support bracket 42a is more likely to be displaced in a vertical direction than in a horizontal direction. Specifically, the amount of displacement of the spout port-side support bracket 42a in the case of pressing it in a vertical direction is greater than that in the case of pressing it in a horizontal direction with the same power.

Further, around the shaft portion of the screw 58a, an annular protrusion 58e having a triangle cross-section is formed at the position fitting together with the spout port-side support bracket 42a. By providing the protrusion 58e, the spout port-side support bracket 42a is also displaced in a vertical direction even when it is pressed in a horizontal direction. Specifically, the peripheral portion 58d is slid upwardly or downwardly on a slope of the protrusion 58e by a horizontal pressing force, which produces vertical displacement in the spout port-side support bracket 42a. Therefore, even when a horizontal excitation force acts on the spout port-side support bracket 42a, a part of the excitation force is converted to a vertical direction and vibration having vertical components is excited in the spout port-side support bracket 42a.

Likewise, as illustrated in FIG. 10(b), the solenoid valve-side rubber bush 60 is formed of an upper surface portion 60b which is located on an upper surface of the solenoid valve-side support bracket 56a as a support bracket, a lower surface portion 60c which is located on a lower surface of the solenoid valve-side support bracket 56a, and a peripheral portion 60d which is located around the screw 60a.

Accordingly, when the generator 14 and the third solenoid valve-side water-passage forming member 56 are displaced in a vertical direction, the upper surface portion 60b and the lower surface portion 60c of the solenoid valve-side rubber bush 60 are mainly subjected to elastic deformation. On the other hand, when the generator 14 and the third solenoid valve-side water-passage forming member 56 are displaced in a horizontal direction, the peripheral portion 60*d* of the solenoid valve-side rubber bush 60 is mainly subjected to elastic deformation. Further, thickness of the upper surface portion 60*b* and the lower surface portion 60*c* of the solenoid valve-side rubber bush 60 is greater than thickness of the peripheral portion 60*d*, and thus the solenoid valve-side support bracket 56*a* is more likely to be displaced in a vertical direction than in a horizontal direction. Specifically, the amount of displacement of the solenoid valve-side support bracket 56*a* in the case of pressing it in a vertical direction is greater than that in the case of pressing it in a horizontal direction with the same power.

Further, around the shaft portion of the screw 60*a*, an annular protrusion 60*e* having a triangle cross-section is formed at the position fitting together with the solenoid valve-side support bracket 56*a*. By providing the protrusion 60*e*, the solenoid valve-side support bracket 56*a* is also displaced in a vertical direction even when it is pressed in a horizontal direction. Specifically, the peripheral portion 60*d* is slid upwardly or downwardly on a slope of the protrusion 60*e* by a horizontal pressing force, which produces vertical displacement in the solenoid valve-side support bracket 56*a*. Therefore, even when a horizontal excitation force acts on the solenoid valve-side support bracket 56*a*, a part of the excitation force is converted to a vertical direction and vibration having vertical components is excited in the solenoid valve-side support bracket 56*a*. For this reason, even when the generator 14 receives an excitation force in random direction, it is greatly vibrated in a vertical direction.

In this regard, the upper surface portion 60*b* and the lower surface portion 60*c* of the solenoid valve-side rubber bush 60 are formed to have larger thickness than the upper surface portion 58*b* and the lower surface portion 58*c* of the spout port-side rubber bush 58. Therefore, a force required to cause a certain amount of elastic deformation is smaller in the solenoid valve-side rubber bush 60 than in the spout port-side rubber bush 58. In other words, configuration is made such that a force required to cause an upward or downward displacement by a certain distance is smaller in the solenoid valve-side support bracket 56*a* than in the spout port-side support bracket 42*a*.

By configuring and arranging the packings (gaskets) 52*a*, 54*a* and 56*b* (first elastic members), the packing (gasket) 42*b* (second elastic member), the spout port-side rubber bush 58 (fourth elastic member), and the solenoid valve-side rubber bush 60 (third elastic member) in this way, the generator 14 is supported to be vibrated more largely on the upstream side which is closer to the solenoid valve 12 than on the downstream side which is closer to the spout port 6. In addition, the spout port-side rubber bush 58 and the solenoid valve-side rubber bush 60 is configured to have a greater amount of deformation than the packings (gaskets) 52*a*, 54*a* and 56*b* and the packing (gasket) 42*b*. Further, the blade 26*a* of the impeller 26 is located at a position closer to the solenoid valve-side rubber bush 60 than the spout port-side rubber bush 58, and thus the generator 14 is more likely to be vibrated on its upstream side.

In addition, the spout port-side rubber bush 58 and the solenoid valve-side rubber bush 60 are configured mainly to allow vertical vibration of the generator 14. However, as illustrated in FIG. 11, the support packing (gasket) 50 which provides an elastic support for the spout port-side water-passage forming member 42 is disposed on a plane inclined with respect to a horizontal direction. For this reason, the support packing (gasket) 50 acts mainly to allow vibration in a direction which is inclined with respect to a vertical direction, and constrains the vibration in a vertical direction as compared to the vibration in this inclined direction. As a result, for vibration in a vertical direction, the generator 14 vibrates based approximately on the support packing (gasket) 50 as a supporting point, and an amplitude of vertical vibration of the generator 14 becomes larger in a direction further from the support packing (gasket) 50. This vertical vibration is allowed by the spout port-side rubber bush 58 and the solenoid valve-side rubber bush 60. On the other hand, the vibration on the downstream side of the support packing (gasket) 50 is not constrained because the spout port forming ring 44 which is attached to the downstream side of the spout port-side water-passage forming member 42 keeps a gap with respect to the spout port disposing aperture 2*c* and is attached to be out of contact with the device body 2. It is noted that the lower end of the spout port forming ring 44 is located at a position closer to the support packing (gasket) 50 than the generator 14, and thus an amplitude of vibration based on the support packing (gasket) 50 as a supporting point is greater in the generator 14 than in the lower end of the spout port forming ring 44.

Figure 12:
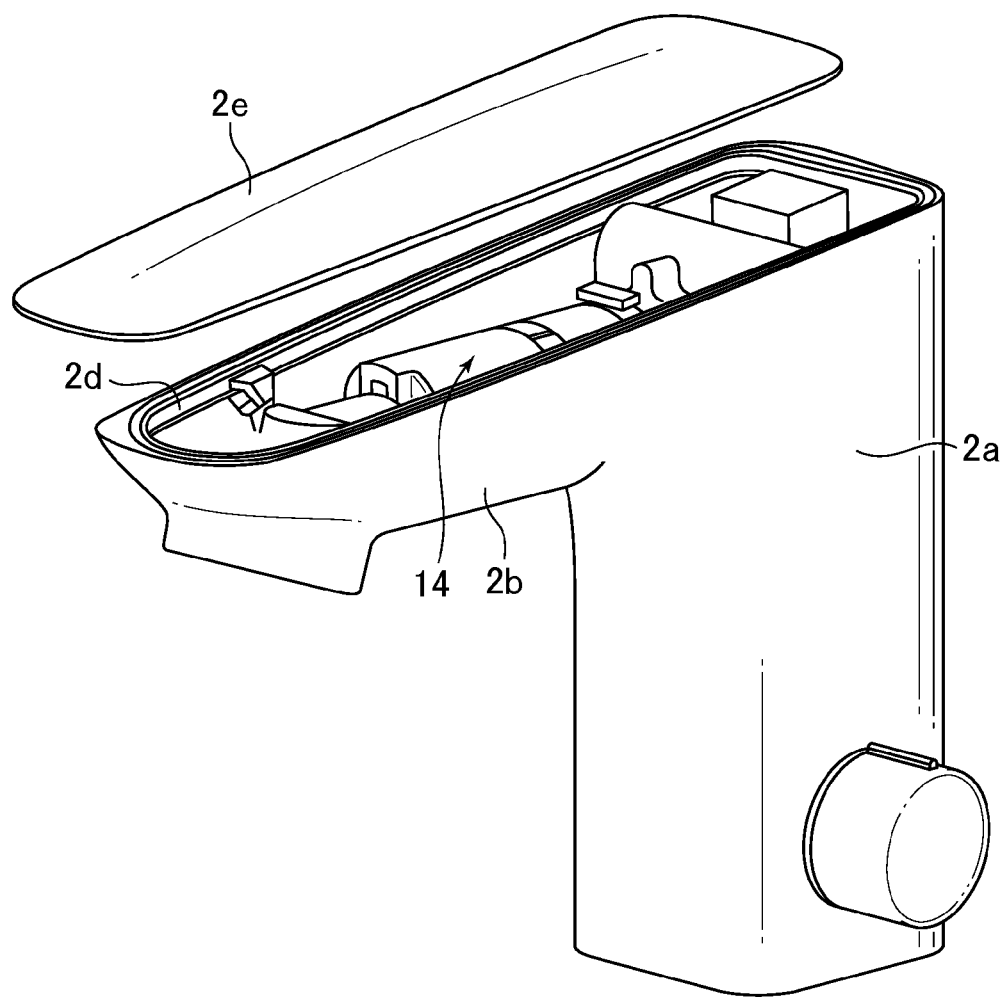
FIG. 12 is a perspective view illustrating the situation where a cover portion is removed from a horizontal portion of the device body.

An assembling procedure of the faucet device 1 according to the embodiment now be described with reference to FIGS. 3, 4 and 12. FIG. 12 is a perspective view illustrating the situation where a cover portion 2*e* is removed from a horizontal portion 2*b* of the device body 2.

First, as illustrated in FIG. 3, in assembling the faucet device 1, the first solenoid valve-side water-passage forming member 52, the second solenoid valve-side water-passage forming member 54 and the third solenoid valve-side water-passage forming member 56 are attached to the upstream side of the generator 14, respectively through the intermediary of a packing (gasket) between each member. On the other hand, to the downstream side of the generator 14, the spout port-side water-passage forming member 42 is attached via a packing (gasket). A unit including the generator 14 that is assembled in this way is disposed and mounted within the horizontal portion 2*b* through the opening 2*d* on the upper side of the horizontal portion 2*b*. Specifically, the lower end portion of the third solenoid valve-side water-passage forming member 56 is inserted into the base member 59 via an O-ring. Further, the support packing (gasket) 50 (FIG. 11) is disposed between the spout port-side water-passage forming member 42 and the horizontal portion 2*b*.

After disposing the assembled unit in place in the horizontal portion 2*b*, the spout port-side support bracket 42*a* is fixed by the screw 58*a* to the horizontal portion 2*b*, and the solenoid valve-side support bracket 56*a* is fixed by the screw 60*a* to the horizontal portion 2*b*. Specifically, the spout port-side water-passage forming member 42 is detachably coupled to the horizontal portion 2*b* via the spout port-side rubber bush 58, and the third solenoid valve-side water-passage forming member 56 is detachably coupled to the horizontal portion 2*b* via the solenoid valve-side rubber bush 60. These tasks can be easily done from the upper side through the opening 2*d* on the upper side of the horizontal portion 2*b*. After fixing the unit, the cover portion 2*e* is put on the opening 2*d* and fixed to the device body 2 by a cover body locking screw 2*f*. Specifically, the cover portion 2*e* is detachably attached to the horizontal portion 2*b* by the cover body locking screw 2*f*.

Figure 13:
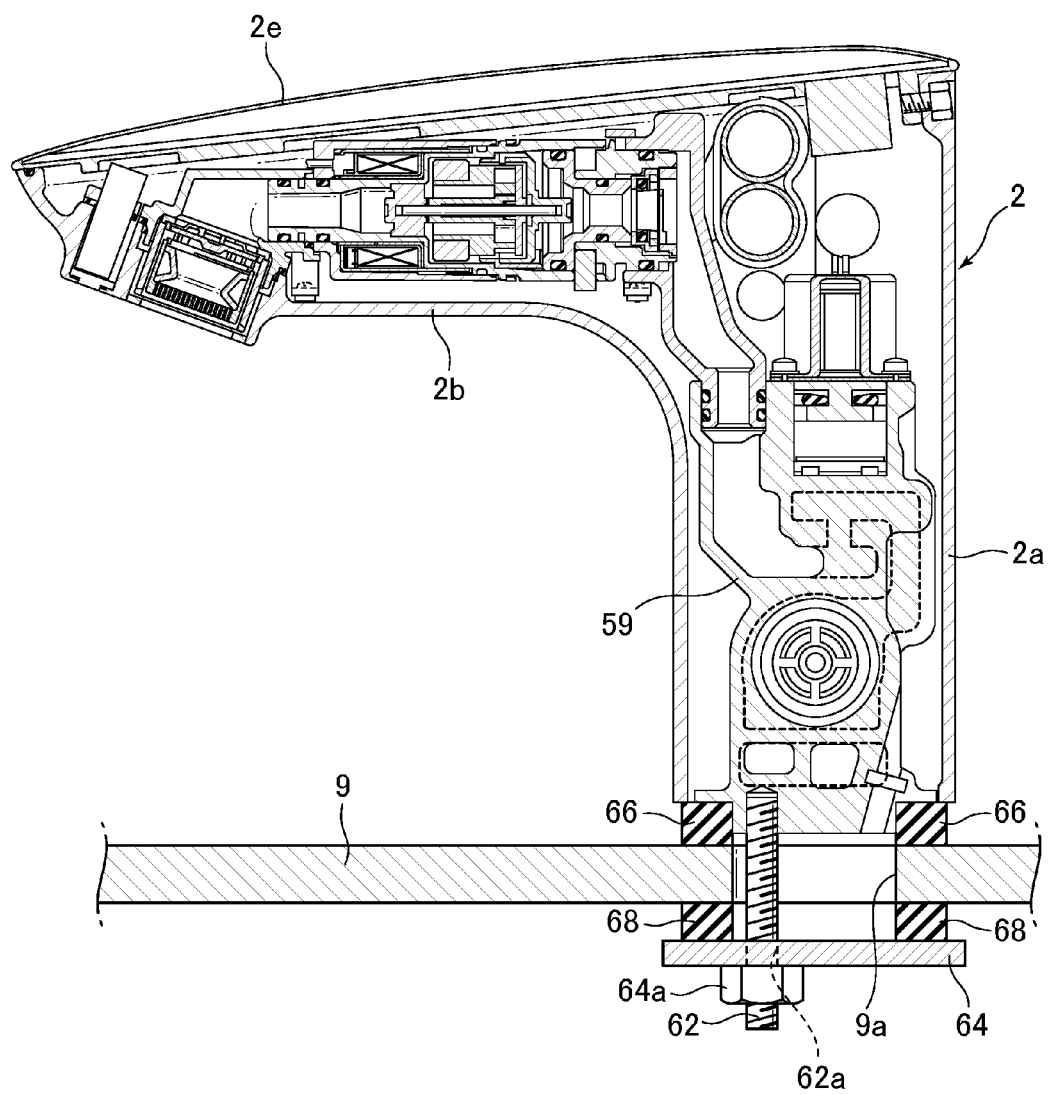
FIG. 13 is a cross-sectional view illustrating the situation where the faucet device is installed on an installation wall in accordance with the embodiment.

An installation procedure of the faucet device 1 on the installation wall 9 will now be described with reference to FIG. 13. FIG. 13 is a cross-sectional view illustrating the situation where the faucet device 1 is installed on an installation wall 9.

As illustrated in FIG. 13, the faucet device 1 is fixed by a fixing shaft 62, a fastener member 64, a fixing nut 64*a*, a topside elastic mount member 66, and a backside elastic mount member 68. The fixing shaft 62 is provided with a screw thread and is threadingly received by the base member 59 in the device body 2. The fastener member 64 is a C-shaped member to be disposed to surround a mounting hole 9a provided in the installation wall 9, in which a bore 62a for permitting the passage of the fixing shaft 62 is provided. The topside elastic mount member 66 is an annular elastic member to be disposed on the installation wall 9. The backside elastic mount member 68 is an annular elastic member to be disposed on the back side of the installation wall 9.

First, the fixing shaft 62 is attached to the base member 59 in the device body 2. Then, the topside elastic mount member 66 is disposed on the upper surface of the installation wall 9, and then the faucet device 1 is disposed on the installation wall 9 in a manner to cause the fixing shaft 62 to be passed through the mounting hole 9a formed in the installation wall 9. As a result, the topside elastic mount member 66 is sandwiched between the bottom surface of the base portion 2a and the installation wall 9. Then, the backside elastic mount member 68 is disposed on the backside of the installation wall 9 in a manner to surround the mounting hole 9a. Further, the backside elastic mount member 68 is held from the downside in a manner to cause the fixing shaft 62 to be passed through the bore 62a of the fastener member 64. In this condition, the fixing nut 64a is threadingly received by the fixing shaft 62, and the fastener member 64 is tightened up. As a result, the topside elastic mount member 66 is sandwiched between the bottom surface of the base portion 2a and the upper surface of the installation wall 9, and the backside elastic mount member 68 is sandwiched between the lower surface of the installation wall 9 and the fastener member 64.

According to this structure, vibration propagated from the bottom surface of the base portion 2a to the installation wall 9 is suppressed by the topside elastic mount member 66, and vibration propagated from the base portion 2a to the installation wall 9 via the fixing shaft 62 and the fastener member 64 is suppressed by the backside elastic mount member 68.

Figure 14:
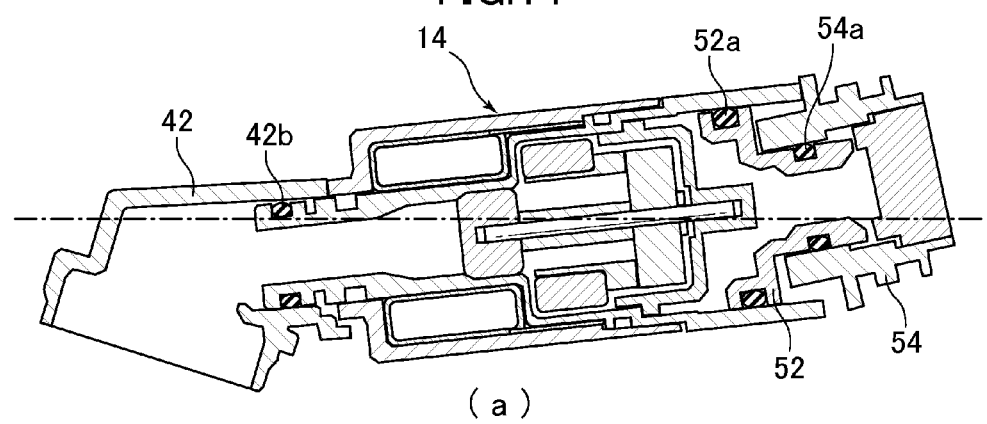
FIG. 14 schematically illustrates a displacement among the generator, a spout port-side water-passage forming member, a first solenoid valve-side water-passage forming member, and a second solenoid valve-side water-passage forming member.
Figure 14:
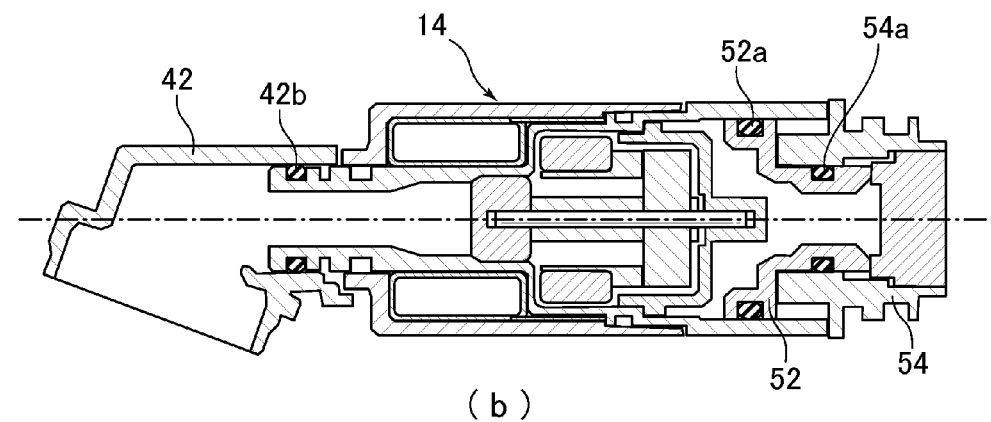
Figure 14:
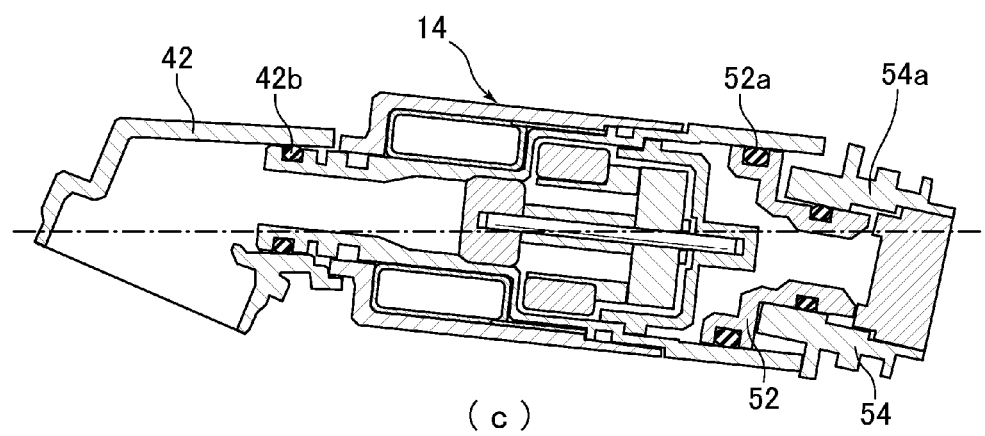
Figure 15:
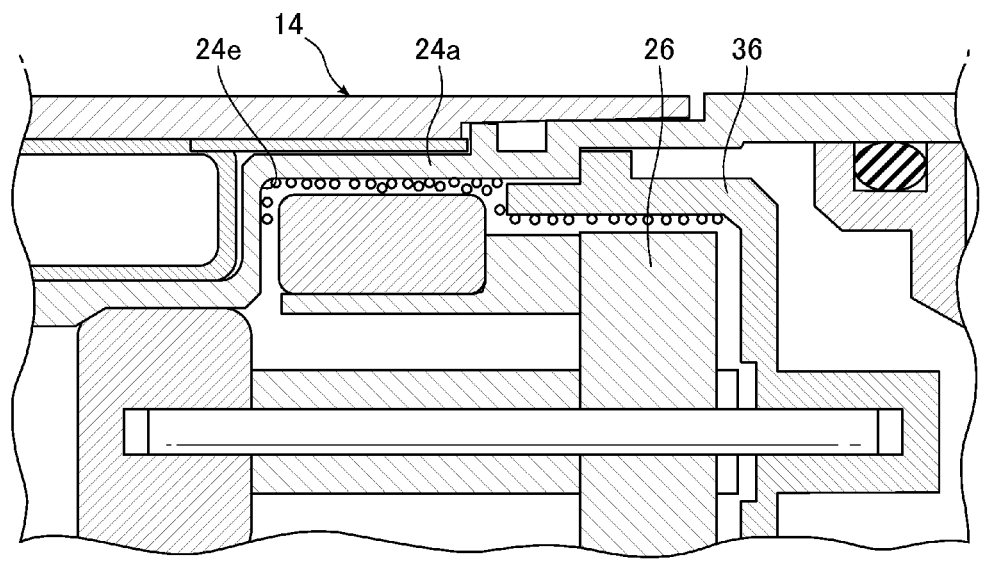
FIG. 15 illustrates the condition of air pooled in an air pooling chamber.
Figure 15:
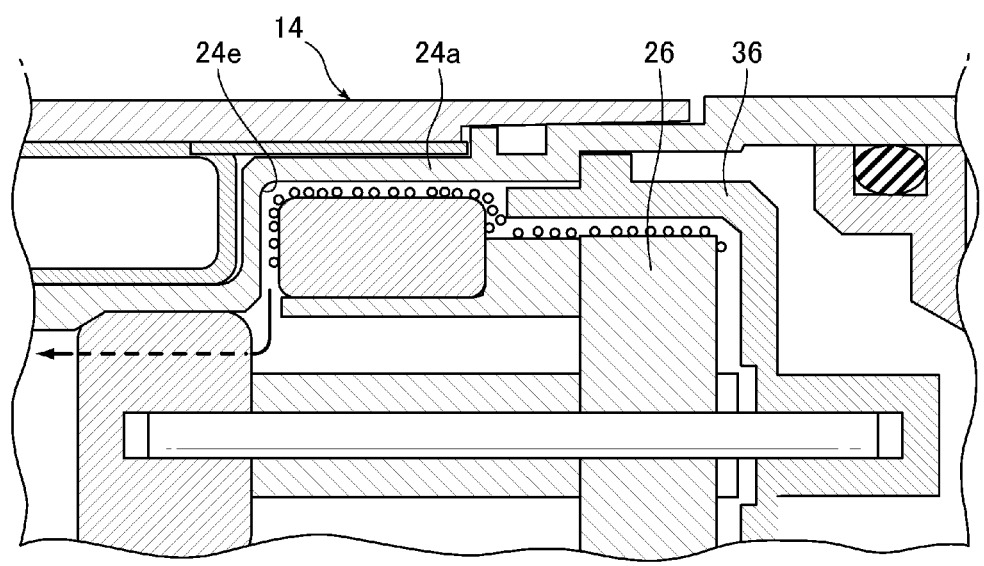
Figure 16:
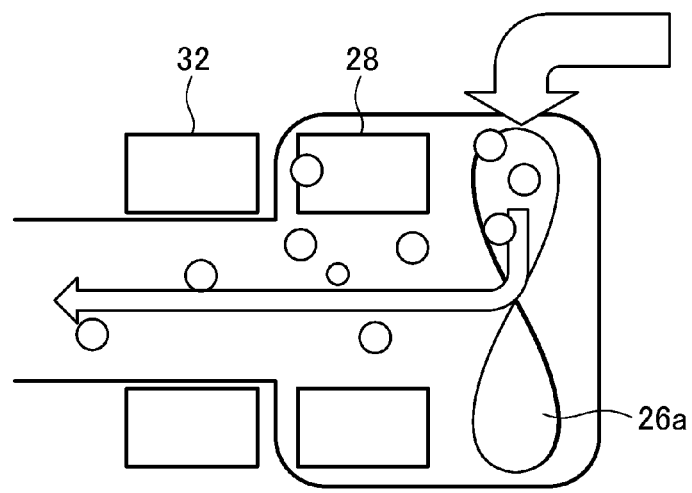
FIG. 16 schematically illustrates a pathway through which air pooled in an air pooling chamber is evacuated.
Figure 16:
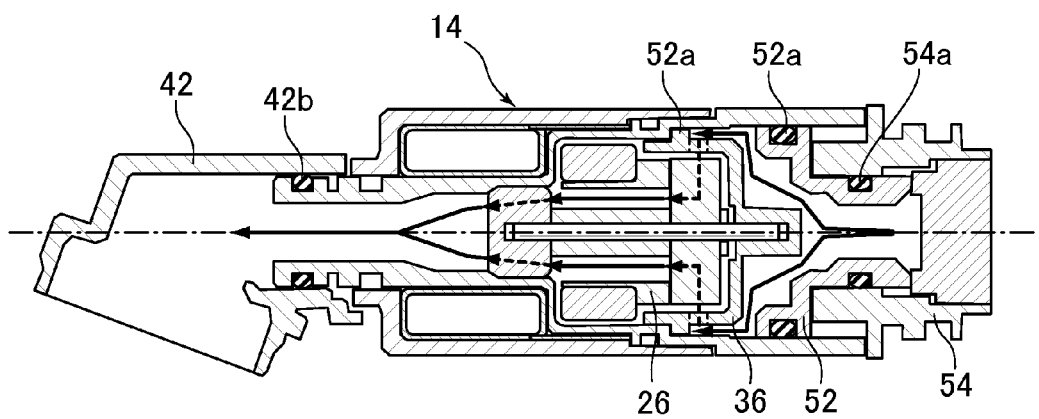

Operation of the faucet device 1 according to the embodiment will now be described with reference newly to FIGS. 14 to 16. FIG. 14 schematically illustrates a displacement among the generator 14, a spout port-side water-passage forming member 42, a first solenoid valve-side water-passage forming member 52, and a second solenoid valve-side water-passage forming member 54. FIG. 15 illustrates the condition of air pooled in an air pooling chamber 24d. FIG. 16 schematically illustrates a pathway through which air pooled in an air pooling chamber 24d is evacuated.

First, when a user places his/her finger over the presence sensor 8 provided on the distal end of the device body 2, the presence sensor 8 detects it and sends a signal to the controller 16. When the presence sensor 8 detects the finger, the controller 16 sends a signal to the solenoid valve 12 and switches it to an open state. When the solenoid valve 12 is opened, hot water and cold water which are supplied from the hot water supply pipe 18a and the cold water supply pipe 18b are respectively supplied to the temperature adjusting valve 10. The supplied hot water and cold water are mixed within the temperature adjusting valve 10, and flows as indicated by an arrow in FIG. 3 to reach the generator 14. Specifically, the supplied hot water and cold water are adjusted by the temperature adjusting valve 10 to a temperature set by the temperature adjusting knob 4, and then flow out. The hot and cold water that has flowed out from the temperature adjusting valve 10 passes through the solenoid valve 12 which is in an open state.

The hot and cold water that has passed through the solenoid valve 12 flows inside of the third solenoid valve-side water-passage forming member 56, the second solenoid valve-side water-passage forming member 54 and the first solenoid valve-side water-passage forming member 52 which constitute the solenoid valve-side line 20, and then reaches the generator 14. Then, the hot and cold water that has flowed into the large diameter portion 24a of the generator water-passage forming member 24 flows around the nozzle casing 36 which is disposed in the central region of the large diameter portion 24a, and is injected from the side-on injection port 36b in a direction orthogonal to the impeller rotary shaft 30 to hit against the blade 26a of the impeller 26 from the lateral side. This flow of hot and cold water in a direction approximately orthogonal to the impeller rotary shaft 30 of the impeller 26 produces rotation of the impeller 26. The hot and cold water that has produced the rotation of the impeller 26 passes through the impeller water-passage 26b provided in the impeller 26, the bearing hole 34a provided in the bearing portion 34, and the small diameter portion 24b of the generator water-passage forming member 24, and then flows out from the generator 14. The hot and cold water that has passed the generator 14 flows into the spout port-side water-passage forming member 42 constituting the spout port-side line 22, passes through the spout port forming ring 44 and the flow rectifying member 46 which are coupled to the spout port-side water-passage forming member 42, and then spouted from the spout port 6.

In addition, the power generating magnet 28 attached to the impeller 26 is rotated with a rotation of the impeller 26, so that the magnetic field formed around the power generating magnet 28 is changed. This change in the magnetic field is induced by the pole piece 40 to the power generating coil 32, developing electromotive force in the power generating coil 32. At this time, electromagnetic force acts between the power generating magnet 28 and the pole piece 40, which varies with the rotation of the impeller 26. This variation in the electromagnetic force becomes one of vibration sources for producing vibration in the generator 14. At the same time, electrical power generated by the generator 14 is charged in a built-in charger (not shown) in the controller 16, and used for opening and closing of the solenoid valve 12, for operation of the presence sensor 8, and for operation of the controller 16 itself.

Then, when the user's finger is not detected by the presence sensor 8 any more, the controller 16 send a signal to the solenoid valve 12 and switches it to a closed state. This makes the faucet device 1 to be in a water stopping state. After the faucet device 1 is made to be in a water stopping state, gravity would act on the hot and cold water within the solenoid valve-side line 20, the spout port-side line 22 and the generator water-passage forming member 24 which are the water passage on the downstream side of the solenoid valve 12, and would prompt the hot and cold water to flow down from the spout port 6 that is located below the water passage. Meanwhile, the spout port 6 includes the flow rectifying member 46 disposed therein, which is adapted to cause the hot and cold water that is to be flowed out from the spout port 6 to be flowed out through a large number of fine pores provided on the flow rectifying member 46. For this reason, surface tension acts against the gravity which prompts the inner hot and cold water to flow down, by which the outflow of the hot and cold water within the water passage is suppressed. However, a part of the hot and cold water within the water passage flows out through the fine pores on the flow rectifying member 46, and outside air enters into the water passage as substitute for the hot and cold water that has flowed out. In addition, the hot and cold water within the water passage is also reduced by being evaporated into the outside air.

The outside air that has entered into the water passage is floated and moved up as bubbles within the water passage. As a result, the entered outside air is gathered in the air pooling chamber 24d (FIG. 3) that is an upper portion of the large diameter portion 24a and is a space located on the uppermost side in the water passage. The air that has entered into the water passage, especially inside of the generator 14, causes a negative effect on the operation of the generator 14, and lowers the power generation efficiency or renders the electric-generating capacity unstable. Moreover, the entered air may generate abnormal noise from the generator 14, or it may shorten the life of the generator 14 in the case of having a significant effect. In addition, as to the air pooled within the generator 14, the total amount thereof is not easily extruded by the hot and cold water flowing inside even after switched to a water spouting state, and the air remains pooled in the generator 14 in a conventional faucet device.

In the faucet device 1 according to the embodiment, the generator 14 is configured to easily vibrate relative to the device body 2 by the spout port-side rubber bush 58 and the solenoid valve-side rubber bush 60. Further, the packing (gasket) 42b is disposed between the generator 14 and the spout port-side water-passage forming member 42, and the packings (gaskets) 52a, 54a and 56b are disposed between the generator 14 and the third solenoid valve-side water-passage forming member 56 respectively, and these packings (gaskets) allow relative displacement between the generator 14 and each water-passage forming member. With this arrangement, the generator 14 and the members connected thereto are vibrated as illustrated in FIG. 14. It is noted that the amount of displacement in FIG. 14 is depicted with exaggeration.

These rubber bushes and packings (gaskets) suppress the propagation of vibration to the device body 2 which is excited in the generator 14 by the electromagnetic force acting between the power generating magnet 28 and the pole piece 40 as well as by the flow of hot and cold water inside the generator 14, when the faucet device 1 is switched to the water spouting state. In addition, the topside elastic mount member 66 suppresses the propagation of vibration of the device body 2 to the installation wall 9. Further, the backside elastic mount member 68 prevents the vibration of the device body 2 from being propagated to the fixing shaft 62 and the fastener member 64 to cause vibration of the installation wall 9. In this way, generation of abnormal noise caused by the vibration of the generator 14 which is propagated to the device body 2 and the installation wall 9 is suppressed.

On the other hand, vibration of the generator 14 facilitates the evacuation of air, which is pooled inside, along with the hot and cold water flowing inside. Specifically, as illustrated in FIG. 15, the air in the generator 14 floats in the large diameter portion 24a, and is gathered and pooled near the inner wall surface on the upper side of the large diameter portion 24a located on the vertically uppermost side. In such an area near the inner wall surface, the flow rate of the hot and cold water flowing through the large diameter portion 24a is slow, and thus the air is not easily evacuated even if the hot and cold water flows through the generator 14. In this case, when the generator 14 is vertically vibrated, the air bubbles that have been pooled near the inner wall surface are drawn away from the wall surface and moved near the center of the flow path. When the air bubbles are drawn away from the inner wall surface, they are evacuated from the generator 14 by the hot and cold water flowing through the large diameter portion 24a because the flow rate is relatively high in the area distant from the wall surface. In addition, as stated above, the spout port-side rubber bush 58 and the screw 58a, as well as the solenoid valve-side rubber bush 60 and the screw 60a act to convert the horizontal excitation force to vertical vibration components, and thus vibration including a number of vertical components is excited in the generator 14.

Further, the corner portion 24e at a downstream edge of the large diameter portion 24a is formed to have an arc-shaped cross-section, and thus it facilitates the evacuation of air bubbles made by the flow of hot and cold water passing the outside of the impeller 26.

Furthermore, as schematically illustrated in FIG. 16(a), the hot and cold water that has flowed into the generator 14 is injected from the injection port 36b on the side of the nozzle casing 36 and hits against the blade 26a of the impeller 26. This flow of hot and cold water from the injection port 36b toward the center of the impeller 26 causes the air bubbles in the large diameter portion 24a to move to the central region of the impeller 26. As a result, as illustrated in FIG. 16(b), the air bubbles in the large diameter portion 24a are evacuated to the outside of the generator 14 through the impeller water-passage 26b of the impeller 26.

Further, the solenoid valve-side rubber bush 60 is configured to be more likely to allow the vibration than the spout port-side rubber bush 58, and thus the upstream side of the generator 14 on which the large diameter portion 24a is positioned is more largely vibrated than the downstream side. This facilitates the evacuation of air in the large diameter portion 24a. Further, the impeller 26 which is relatively light in weight is disposed on the upstream side of the generator 14, while the power generating coil 32 and the power generating magnet 28 which are heavy in weight are disposed on the downstream side, and thus the upstream side of the generator 14 is likely to be vibrated with larger amplitude than the downstream side.

In addition, in order to cause the generator 14 to vibrate, it is necessary for the solenoid valve-side line 20 and the spout port-side line 22 which are connected to the generator 14 to be deformed. In this regard, the solenoid valve-side line 20 is configured to have the packings (gaskets) 52a, 54a and 56b which are interposed between each member, while the spout port-side line 22 is only provided with the packing (gasket) 42b, so that the solenoid valve-side line 20 is more likely to be deformed.

In addition, the spout port side of the generator 14 is connected to the separately constituted spout port-side water-passage forming member 42, and is supported to the device body 2 by the spout port-side rubber bush 58 via the spout port-side support bracket 42a provided on the spout port-side water-passage forming member 42.

Also, the solenoid valve side of the generator 14 is connected to the separately constituted third solenoid valve-side water-passage forming member 56, and is supported to the device body 2 by the solenoid valve-side rubber bush 60 via the solenoid valve-side support bracket 56a provided on the third solenoid valve-side water-passage forming member 56. This allows relative movement between the generator 14 and the members supporting the generator 14, so that the generator 14 is more likely to be vibrated. Specifically, as illustrated in FIG. 14, the amount of deformation becomes larger in a direction from the spout port-side line 22 on the downstream side to the solenoid valve-side line 20 on the upstream side of the generator 14.

Further, the vibration of the generator 14 also causes the vibration of the spout port-side line 22 connected thereto, but the vibration of the generator 14 is not interrupted by the spout port forming ring 44 attached to a distal end of the spout port-side line 22 because the spout port forming ring 44 is disposed on the spout port-side line 22 in a manner to be out of contact with the device body 2.

In addition, the spout port-side water-passage forming member 42 constituting the spout port-side line 22 is elastically supported to the device body 2 by the support packing (gasket) 50. For this reason, the vibration of the generator 14 will be the vertical one based approximately on the support packing (gasket) 50 as a supporting point. In this regard, the spout port forming ring 44 is disposed at a position closer to the support packing (gasket) 50 than the generator 14, and thus the vibration based on the support packing (gasket) 50 as a supporting point has a relatively small amplitude on the side of the spout port forming ring 44, so that even when the generator 14 is largely vibrated, the flow of hot and cold water spouted from the spout port forming ring 44 is not deflected largely.

Further, the packing (gasket) 42b is disposed between the large diameter portion 24a of the generator 14 and the spout port-side water-passage forming member 42 to form a flection allowing portion. As a result, a part of vibration of the generator 14 is absorbed by the flection allowing portion, thereby the vibration propagated from the generator 14 to the spout port forming ring 44 is decreased to reduce deflection of the spout port forming ring 44.

In addition, the spout port forming ring 44 is disposed with being retracted more to the inner side than the spout port disposing aperture 2c of the device body 2, and thus even if the spout port forming ring 44 is vibrated, it is difficult to visibly recognize this vibration, and the appearance of the faucet device 1 is not detracted. Further, the gap between the spout port forming ring 44 and the spout port disposing aperture 2c is covered with the gap cover 48, so that even if the gap is present between the device body 2 and the spout port forming ring 44, it does not detract the appearance of the faucet device 1, and the vibration of the spout port forming ring 44 is hidden from the outside.

Further, when the generator 14 is vibrated, the generator water-passage forming member 24 is affected by a force which deforms it. In particular, this force is likely to concentrate on the stepped portion 24c which connects the large diameter portion 24a to the small diameter portion 24b, but the stress acting on the generator water-passage forming member 24 is escaped by configuring this stepped portion 24c to be deformable as a deformation permissive portion. However, excessive deformation of the stepped portion 24c may lead to destruction of generator water-passage forming member 24, and thus the power generating coil 32 is disposed adjacent to the stepped portion 24c to prevent the excessive deformation of the stepped portion 24c.

Further, the pawls 40a of the pole piece 40 are disposed in a manner to go across the stepped portion 24c, thereby the amount of deformation of the stepped portion 24c is limited. In addition, the bearing portion 34 is fitted inside of the small diameter portion 24b that is adjacent to the stepped portion 24c, and thus the amount of deformation of inner periphery of the stepped portion 24c is limited. Further, the impeller rotary shaft 30 of the impeller 26 is also disposed in a manner to go across the stepped portion 24c, thereby the amount of deformation of the stepped portion 24c is limited. Besides, the waterproof cover 38 covers the power generating coil 32 and the pole piece 40 and is disposed in a manner to cover the large diameter portion 24a and the small diameter portion 24b provided on both sides of the stepped portion 24c, and thus the deformation of the stepped portion 24c is also limited by the waterproof cover 38.

According to the faucet device of the embodiment, the solenoid valve side of the generator 14 is coupled to the device body 2 via the packings (gaskets) 52a, 54a and 56b and the solenoid valve-side rubber bush 60, and the spout port side of the generator 14 is coupled to the device body 2 via the packing (gasket) 42b and the spout port-side rubber bush 58, and thus the vibration propagated to the device body 2 can be sufficiently suppressed and the generated abnormal noise can also be suppressed. It is noted that when it is sought to ensure a large vibration stroke for suppressing the propagation of vibration only with the seal material between the generator and the water-passage forming member, the vibration of the generator would develop a seal defect which results in water leak and decreased durability of the seal material. According to the faucet device 1 of this embodiment, the propagation of the vibration is suppressed in two stages: one by the packings (gaskets) disposed between the generator and the water-passage forming member connected thereto, and one by the rubber bushes disposed between the connected water-passage forming member and the device body 2. This allows the packings (gaskets) for ensuring water-tightness to be utilized for suppression of vibration, while sufficiently suppressing the propagation of vibration. Further, ensuring of the vibration stroke is performed in two stages, so that decrease in water-tightness and degradation of stability of the packings (gaskets) can be avoided.

In addition, according to the faucet device of this embodiment, the spout port-side rubber bush 58 and the solenoid valve-side rubber bush 60 excite vibration having vertical components by a horizontal excitation force, and thus the vibration of the generator would be larger in a vertical direction and smaller in a horizontal vibration. For this reason, even if the stream of water spouted from the faucet device 1 is vibrated due to the vibration of the generator 14, the vibration is mainly of the same vertical direction as the direction in which the spouted water flows, and is less recognizable by a user relative to the case in which it is vibrated in a horizontal direction. This makes it possible to sufficiently suppress the propagation of vibration of the generator 14, while reducing disturbance in the stream of water which is recognizable by the user to allow the faucet device 1 to have an improved quality level.

Further, according to the faucet device 1 of this embodiment, the straight line connecting the spout port-side rubber bush 58 and the solenoid valve-side rubber bush 60 is oriented toward a substantially horizontal direction, so that vertical vibrational components of the generator 14 can be further increased and disturbance in the stream of water which is recognizable by the user can be reduced more.

In addition, according to the faucet device 1 of this embodiment, the solenoid valve-side rubber bush 60 is formed to be more susceptible to the deformation, thereby the vibration of the generator 14 becomes larger in a direction to the side closer to the solenoid valve 12, and thus disturbance in the streams of spouted water can be reduced. Further, vibration of the device body 2 can be better suppressed because vibration is reduced on the spout port side which is closer to the distal end of the device body 2b and is difficult to ensure the rigidity.

Further, according to the faucet device 1 of this embodiment, the blade 26a of the impeller 26 is disposed on the side closer to the solenoid valve-side rubber bush 60, and thus the impeller 26, which would be a source of vibration due to the action of electromagnetic force at the time of electrical power generation, does not strongly excite the distal end of the horizontal portion 2b, so that vibration of the device body 2 can be better suppressed.

In addition, according to the faucet device 1 of this embodiment, the impeller and the power generating magnet 28 is disposed in side-by-side relation to each other along the impeller rotary shaft 30, and the power generating magnet 28 is formed to have a similar size of diameter to the blade 26a of the impeller 26, and thus the moment of inertia of the rotating portion of the generator can be decreased as compared to the conventional generators in which a power generating magnet is disposed on the radially outer side of a blade of the impeller. This makes it possible to improve the power generation efficiency of the generator 14, decrease the magnetic flux density of the power generating magnet 28 which is necessary to achieve power requirements, and suppress the generation of vibration.

Further, according to the faucet device 1 of this embodiment, the power generating coil 32, the power generating magnet 28 and the blade 26a of the impeller 26 are disposed in this order from the side closer to the spout port within the generator 14, and thus the blade 26a which would be a source of vibration is located at a position distant from the spout port 6 so that it does not strongly excite the distal end of the horizontal portion 2a, and vibration of the device body 2 can be better suppressed.

In addition, according to the faucet device 1 of this embodiment, magnetism of the power generating magnet 28 is guided by the pole piece 40 to the power generating coil 32, and thus the power generating magnet 28 can be disposed on the downstream side of the power generating coil 32, which enables the blade 26a as a source of vibration to be provided at a position further distant from the spout port 6.

Further, according to the faucet device 1 of this embodiment, the base portion 2a and the horizontal portion 2b of the device body 2 are made from metal and are integrally formed, and thus they are highly rigid and less likely to be vibrated by the vibration of the generator 14, so that the generation of abnormal noise can be suppressed. In addition, the horizontal portion 2b is formed with an opening 2d on the upper side thereof, through which a unitization of assembled generator 14, spout port-side water-passage forming member 42, first to third solenoid valve-side water-passage forming member 52, 54 and 56, packing 42b, 52a, 54a, 56b, spout port-side rubber bush 58 and solenoid valve-side rubber bush 60 can be inserted and mounted, enabling an easy assembly of the faucet device 1. Such a structure of the device body 2 satisfies both of suppression of abnormal noise and improvement of assembly.

In addition, according to the faucet device 1 of this embodiment, the solenoid valve-side rubber bush 60 is formed to be more susceptible to the deformation, thereby the vibration of the generator 14 becomes larger in a direction to the side closer to the solenoid valve 12, and thus disturbance in the streams of spouted water can be reduced. Further, vibration of the device body 2 can be better suppressed because vibration is reduced on the spout port side which is closer to the distal end of the device body 2b and is difficult to ensure the rigidity.

Further, according to the faucet device 1 of this embodiment, the blade 26a of the impeller 26 is disposed on the side closer to the solenoid valve-side rubber bush 60, and thus the impeller 26, which would be a source of vibration due to the action of electromagnetic force at the time of electrical power generation, does not strongly excite the distal end of the horizontal portion 2b, so that vibration of the device body 2 can be better suppressed.

In addition, according to the faucet device 1 of this embodiment, the topside elastic mount member 66 is disposed between the installation wall 9 and the base portion 2a, and thus the vibration that is propagated from the generator 14 to the device body 2 can be prevented from being propagated to the installation wall 9, thereby the abnormal noise that is generated from the installation wall 9 can be suppressed.

Further, according to the faucet device 1 of this embodiment, the backside elastic mount member 68 is disposed between the fastener member 64 and the reverse side of the installation wall 9, and thus the vibration propagated from the device body 2 to the installation wall 9 via the fastener member 64 can be suppressed, thereby the abnormal noise that is generated from the installation wall 9 can be further suppressed.

While a preferred embodiment of the present invention has been described above, various changes may be made to the embodiment described above.

While three injection ports 36b are provided on the nozzle casing 36 in the embodiment described above, the injection port may be one as an alternative. Preferably, the single injection port is formed to locate on the upper end of the large diameter portion 24a. This enables the air bubbles gathered at the upper end of the large diameter portion 24a to be effectively moved to the central region of the impeller through one injection port.

Figure 17:
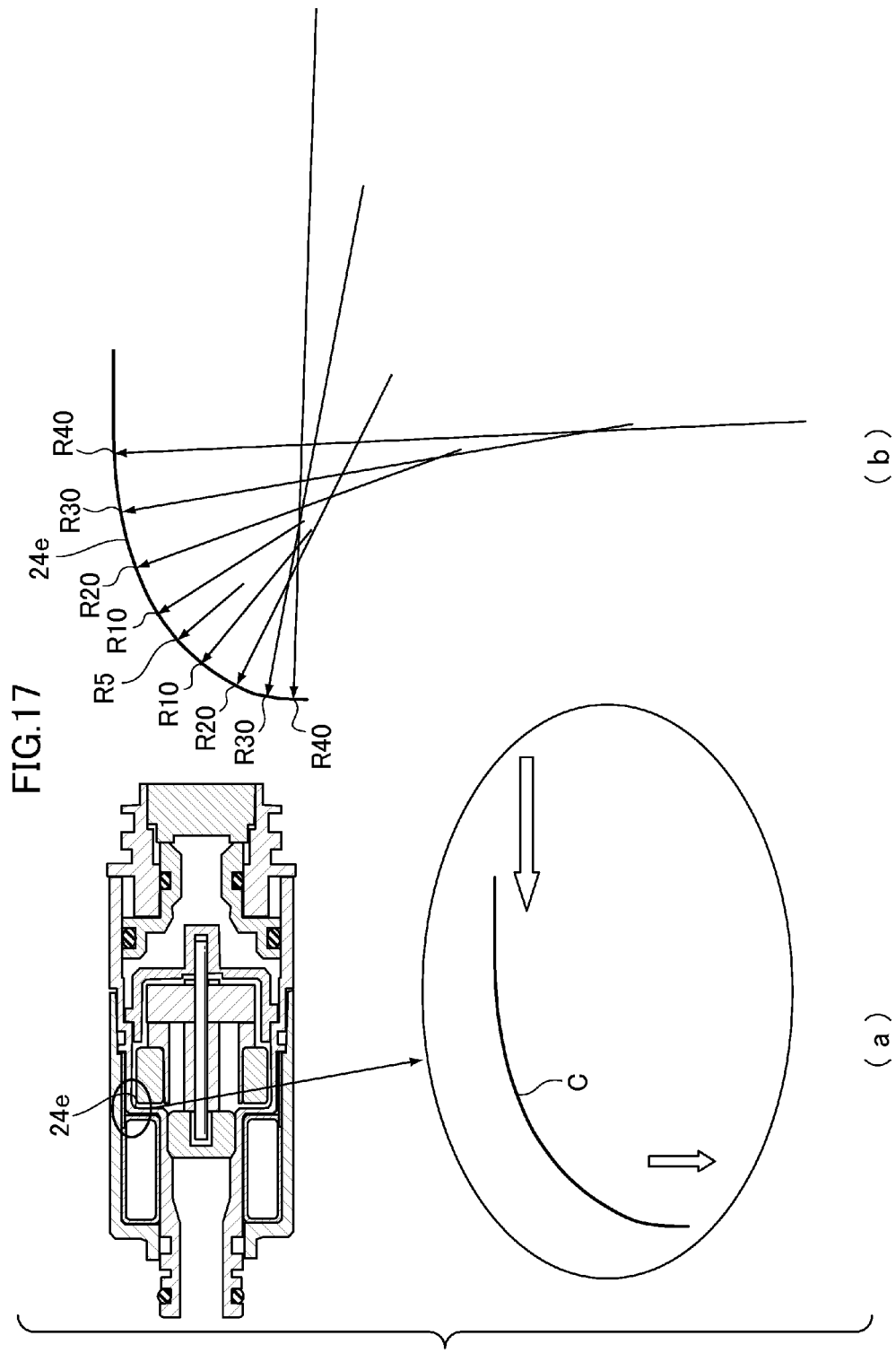
FIG. 17 illustrates a corner portion at a downstream edge of a large diameter portion in an alternative embodiment of the present invention.

In addition, while the corner portion 24e at a downstream edge of the large diameter portion 24a is formed in arc-shape in the embodiment described above, it may be formed, as an alternative, as illustrated in FIG. 17(a), in a curved line having a radius of curvature which changes from the upstream side toward the downstream side. Preferably, the curved line of the corner portion 24e is a clothoid curve C which is found application in a design of road, etc. According to this clothoid curve C, as illustrated in FIG. 17(b), the radius of curvature is large at the beginning of the corner portion 24e, gradually becomes smaller thereafter, becomes the smallest at the midpoint of the corner portion 24e, and then again becomes larger toward the end point of the corner portion 24e. By forming the corner portion 24e in this manner, the air bubbles flowing along the inner wall surface of the large diameter portion 24a are smoothly changed in direction at the corner portion 24e, and evacuated to the small diameter portion 24b.

Figure 18:
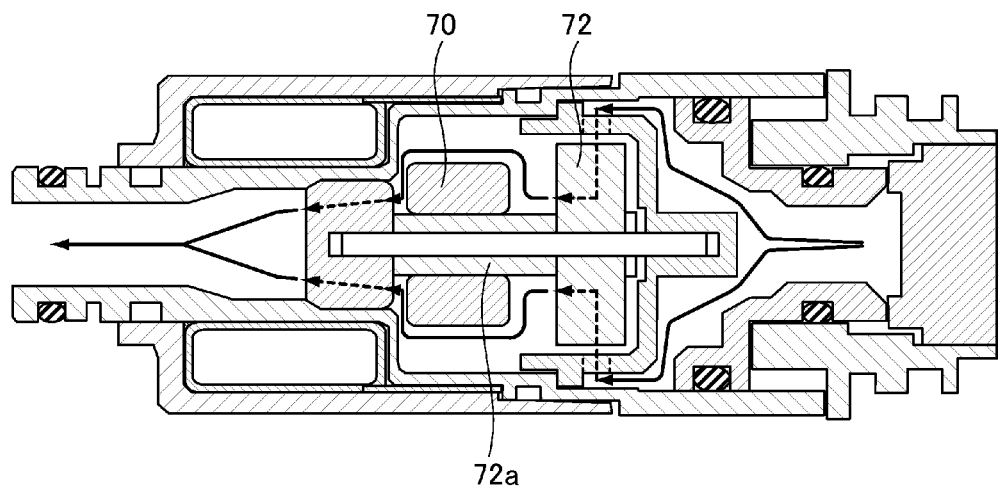
FIG. 18 illustrates an impeller in the alternative embodiment.

Further, while the power generating magnet 28 of the generator 14 is configured in annular-shape, and most of the hot and cold water that has flowed into the generator 14 passes inside of the power generating magnet 28 to flow out in the embodiment described above, it may be possible to configure, as illustrated in FIG. 18 as an alternative, such that the hot and cold water passes outside of the power generating magnet. In the alternative illustrated in FIG. 18, a power generating magnet 70 is configured to have a smaller outer diameter than the outer diameter of the blade 26a of the impeller 26. In addition, the power generating magnet 70 is tightly fitted in a shaft 72a of an impeller 72, and is rotated together with the shaft 72a. For this reason, the hot and cold water that has flowed into the generator 14 exclusively passes outside of the power generating magnet 70 to flow out to the small diameter portion. According to the alternative configured in this manner, the power generating magnet 70 may be configured in small size to make the moment of inertia around the rotation axis of the impeller to be small.

EXPLANATION OF CODES 1. faucet device according to an embodiment of the present invention
2. device body
2a. base portion
2b. horizontal portion
2c. spout port disposing aperture
2d. opening
2e. cover portion
2f. cover body locking screw 4. temperature adjusting knob
6. spout port
8. presence sensor
9. installation wall
9a. mounting hole
10. temperature adjusting valve
12. solenoid valve
14. generator
16. controller
18a. hot water supply pipe
18b. cold water supply pipe
20. solenoid valve-side line
22. spout port-side line
24. generator water-passage forming member
24a. large diameter portion (expanded-diameter portion)
24b. small diameter portion
24c. stepped portion (deformation permissive portion)
24d. air pooling chamber
24e. corner portion (evacuant means)
26. impeller
26a. blade
26b. impeller water-passage
28. power generating magnet
30. impeller rotary shaft
32. power generating coil
34. bearing portion
34a. bearing hole
34b. through-holes
36. nozzle casing
36a. bearing hole
36b. injection port
38. waterproof cover
40. pole piece
40a. pawls
42. spout port-side water-passage forming member
42a. spout port-side support bracket (support bracket)
42b. packing (gasket) (second elastic member)
44. spout port forming ring (spout port forming portion)
46. flow rectifying member
48. gap cover
50. support packing (gasket)
52. first solenoid valve-side water-passage forming member
52a. packing (gasket) (first elastic member)
54. second solenoid valve-side water-passage forming member
54a. packing (gasket) (first elastic member)
56. third solenoid valve-side water-passage forming member
56a. solenoid valve-side support bracket (support bracket)
56b. packing (gasket) (first elastic member)
58. spout port-side rubber bush (fourth elastic member, vibration excitation means)
58a. screw
58b. upper surface portion
58c. lower surface portion
58d. peripheral portion
58e. protrusion
59. base member
60. solenoid valve-side rubber bush (third elastic member, vibration excitation means)
60a. screw
60b. upper surface portion
60c. lower surface portion
60d. peripheral portion
60e. protrusion
62. fixing shaft
62a. bore
64. fastener member
66. topside elastic mount member
68. backside elastic mount member
70. power generating magnet
72. impeller
72a. shaft

What is claimed is:

1. A faucet device configured to drive a solenoid valve by electrical power from a built-in generator to switch between water stopping and water spouting, comprising:
   a device body;
   a solenoid valve disposed within the device body, and adapted to switch between water stopping and water spouting;
   a spout port forming portion formed with a spout port, and adapted to cause water that passes through the solenoid valve to be spouted;
   an impeller-driven generator equipped with an impeller, a power generating magnet and a power generating coil, and adapted to rotate the impeller by flow of water that passes through the solenoid valve to generate electrical power for driving the solenoid valve;
   a solenoid valve-side water-passage forming member for guiding water that passes through the solenoid valve to the generator;
   a spout port-side water-passage forming member for guiding water that passes through the generator toward the spout port;
   a first elastic member for ensuring water-tightness between the solenoid valve-side water-passage forming member and the generator and allowing relative displacement between the solenoid valve-side water-passage forming member and the generator;
   a second elastic member for ensuring water-tightness between the spout port-side water-passage forming member and the generator and allowing relative displacement between the spout port-side water-passage forming member and the generator;
   a third elastic member for coupling the solenoid valve-side water-passage forming member to the device body and allowing relative displacement between the solenoid valve-side water-passage forming member and the device body; and
   a fourth elastic member for coupling the spout port-side water-passage forming member to the device body and allowing relative displacement between the spout port-side water-passage forming member and the device body.

2. The faucet device according to claim 1, wherein the third elastic member and the fourth elastic member are configured to excite vibration having vertical components by a horizontal excitation force.

3. The faucet device according to claim 2, wherein an impeller rotary shaft of the impeller is disposed in a substantially horizontal direction, and the third elastic member and the fourth elastic member are disposed such that a straight line connecting the third elastic member and the fourth elastic member is oriented toward a substantially horizontal direction.

4. The faucet device according to claim 3, wherein the first elastic member, the second elastic member, the third elastic member and the fourth elastic member support the generator such that the vibration of the generator on the side closer to the solenoid valve is larger than the vibration of the generator on the side closer to the spout port.

5. The faucet device according to claim 4, wherein the impeller is disposed between the third elastic member and the fourth elastic member at a position closer to the third elastic member.

6. The faucet device according to claim 2, wherein the impeller, the power generating magnet and the power generating coil are arranged along the impeller rotary shaft of the impeller.

7. The faucet device according to claim 6, wherein the power generating coil, the power generating magnet and the impeller are disposed in this order from the side closer to the spout port.

8. The faucet device according to claim 7, wherein the generator further comprises a pole piece for guiding magnetism of the power generating magnet to the power generating coil, the pole piece extending from the power generating coil to the periphery of the power generating magnet.

9. The faucet device according to claim 1, wherein the device body is made from metal and comprises a base portion, a horizontal portion, and a cover portion, and wherein the base portion is fixed to an installation wall, the horizontal portion is integrally formed with the base portion and extending in a substantially horizontal direction from the base portion, the horizontal portion has an opening on the upper side thereof, and the cover portion detachably attached to the horizontal portion in a manner to cover the opening of the horizontal portion, and wherein the generator, the solenoid valve-side water-passage forming member and the spout port-side water-passage forming member are disposed within the horizontal portion, the third elastic member detachably couples the solenoid valve-side water-passage forming member to the horizontal portion through the opening of the horizontal portion, and the fourth elastic member detachably couples the spout port-side water-passage forming member to the horizontal portion through the opening of the horizontal portion.

10. The faucet device according to claim 9, wherein the first elastic member, the second elastic member, the third elastic member and the fourth elastic member support the generator such that the vibration of the generator on the side closer to the solenoid valve is larger than the vibration of the generator on the side closer to the spout port.

11. The faucet device according to claim 10, wherein the impeller is disposed between the third elastic member and the fourth elastic member at a position closer to the third elastic member.

12. The faucet device according to claim 9, further comprising a topside elastic mount member which is disposed between the installation wall and the base portion, and wherein the topside elastic mount member is adapted to suppress vibration propagated from the device body to the installation wall.

13. The faucet device according to claim 12, further comprising a fastener member and a backside elastic mount member, and wherein the fastener member is disposed on the reverse side of the installation wall, and is adapted to fix the device body to the installation wall by sandwiching the installation wall between the fastener member and the base portion, and wherein the backside elastic mount member is disposed between the fastener member and the reverse side of the installation wall, and is adapted to suppress vibration propagated to the installation wall.

* * * * *